(12) United States Patent
Chaubard

(10) Patent No.: US 11,741,425 B2
(45) Date of Patent: Aug. 29, 2023

(54) OPERATING SYSTEM FOR BRICK AND MORTAR RETAIL

(71) Applicant: Focal Systems, Inc., Burlingame, CA (US)

(72) Inventor: Francois Chaubard, Burlingame, CA (US)

(73) Assignee: Focal Systems, Inc., San Francisco, CA (US)

(*) Notice: Subject to any disclaimer, the term of this patent is extended or adjusted under 35 U.S.C. 154(b) by 372 days.

(21) Appl. No.: 17/023,313

(22) Filed: Sep. 16, 2020

(65) Prior Publication Data

US 2021/0398060 A1 Dec. 23, 2021

Related U.S. Application Data

(60) Provisional application No. 62/901,173, filed on Sep. 16, 2019.

(51) Int. Cl.

| G06Q 10/00 | (2023.01) |
|---|---|
| G06Q 10/087 | (2023.01) |
| G06Q 10/0631 | (2023.01) |
| G06T 7/70 | (2017.01) |

(52) U.S. Cl.
CPC ... *G06Q 10/087* (2013.01); *G06Q 10/063114* (2013.01); *G06Q 10/063118* (2013.01); *G06T 7/70* (2017.01); *G06T 2207/10016* (2013.01)

(58) Field of Classification Search
CPC .................. G06Q 10/087; G06Q 10/063114
See application file for complete search history.

(56) References Cited

U.S. PATENT DOCUMENTS

| 2016/0171432 A1* | 6/2016 | Pugh ................. G06Q 30/0222 705/26.81 |
|---|---|---|
| 2017/0124511 A1* | 5/2017 | Mueller ............... H04W 4/029 |
| 2018/0218494 A1 | 8/2018 | Chaubard et al. |
| 2019/0333081 A1 | 10/2019 | Garel et al. |
| 2020/0027218 A1 | 1/2020 | Buibas et al. |

OTHER PUBLICATIONS

Agnihotram et al., "Combination of advanced robotics and computer vision for shelf analytics in a retail store", IEEE, 2017, pp. 119 to 124, retrieved on Jan. 25, 2022.

* cited by examiner

*Primary Examiner* — Rokib Masud
(74) *Attorney, Agent, or Firm* — Thomas M. Freiburger

(57) ABSTRACT

An operating system for a retail store applies AI to detect, from images of store shelves, out of stock and low stock conditions of shelved items based on camera images. The system takes in a set of input states of the store and recommends corrective action to optimize a set of objectives for the store. These objectives could be to optimize Operating Profit. The input states could be current shelf conditions inferred by shelf cameras. The action could be ordering of restocking, changes in future inventory orders, the number of shelf facings per product, price to charge per product, or labor allocations and scheduling for store staff. Through repeated reiterations over an extended period, the system compares actual results with predicted results and retrains itself to minimize the difference and recommend smarter actions over time to "play the game of retail" better and better each day and in each store.

15 Claims, 29 Drawing Sheets

We place them every 4 - 12 feet depending on the resolution required and the point of view required. Each camera has a shelf mount, a lens, a camera module, and a wire that goes to a communications box. Each communication box has a battery, a wifi communication chip, a board that turns on the camera.

The System produces aggregate reports, emails, texts, and dashboards for store staff and corporate users to see and monitor key metrics.

FIG. 16

Good Evening, Joe!

Here is your newsfeed for today, October 30, 2019.

● One of your stockers is not performing well today. ▼

● There are 5 open priority tasks worth $1,411. ▲

| | TYPE | ACTUAL | VALUE | | | TYPE | ACTUAL | VALUE |
|---|---|---|---|---|---|---|---|---|
| Coca-Cola Classic | OOS | 11 | $348 | Lays Classic | | OOS | 10 | $345 |
| Tide Pods 24pk | OOS | 8 | $312 | Haagen Dasz Vanilla | | Plano | 2 | $233 |
| Lacroix Grapefruit | Plano | 11 | $266 | | | | | |

● Task completion has been 5.3% lower than usually at this time. ▼

● You have 7 new inventory recommendations worth $2,312. ▼

● OSA has been 3.4% higher today than the 30 day average. ▼

FIG. 19

| REGIONAL STORE RANKINGS | | | | ASSOCIATE LEADERBOARD | | | |
|---|---|---|---|---|---|---|---|
| ● Superstore 101 | 26.12 | 94.86% | $5,278 | ● Joe Miller | 26.12 | 94.86% | $5,278 |
| ● Superstore 331 | 24.22 | 94.66% | $5,173 | ● Sharon Jones | 24.22 | 94.66% | $5,173 |
| ● Superstore 238 | 23.15 | 93.86% | $4,878 | ● Michael Cook | 23.15 | 93.86% | $4,878 |
| ● Superstore 421 | 21.12 | 93.44% | $4,778 | ● Janet Meyer | 21.12 | 93.44% | $4,778 |
| ● Superstore 671 | 20.97 | 93.46% | $4,438 | ● Diane Bolt | 20.97 | 93.46% | $4,438 |

FIG. 20

OPERATING SYSTEM FOR BRICK AND MORTAR RETAIL

This application claims benefit from provisional patent application Ser. No. 62/901,173, filed Sep. 16, 2019.

BACKGROUND OF THE INVENTION

Today, retail stores are very hard to operate. Store managers and corporate headquarters have to manage 100,000s of SKUs that they are constantly changing during different seasons trying to keep in stock as customers shop the shelves, predict how much to order next, ensure the right product came in the night before. They have to ensure their stockers do their jobs right, make sure they are working the most important things at the right time and doing so diligently and quickly. They have to deal with any product that breaks, gets stolen, spoils, does not show up as ordered, with 1000s of customers that may need help each day, and do so with less and less labor each year as the price of labor goes up. This is an impossible request that leads to huge inefficiencies, large amounts of out of stocks and long lines at the checkout and in the end, declining profitability. Retailers need a new way to run their stores. Modern advancements in AI can be used to optimize and automate many tasks in the world. It has been used to automate cars and play games like Chess and Go better than even the best human players in the world. In this patent, we show a way to take these modern advancements in AI and apply them to retail to help solve their problems.

Deep Learning Computer Vision can perform product recognition to detect stock levels and shelf conditions, while Reinforcement Learning can be used to "play the game of retail", finding optimal stock levels, staffing levels, prices, and more.

In the end, the only things the store management really have control over are:
1. Labor (L)
   a. Processes and prioritization (SOPs)
   b. Training
   c. Scheduling
   d. Monitoring
   e. Coaching
   f. Engagement
   g. Retention
   h. Firing
   i. Salaries and wages
2. Forecasting and Ordering (F)
3. Planogram or Shelf Capacity (SC)
4. Prices (P)

The goal is to maximize operating profit with those inputs. But doing so manually is extremely difficult. The equation for operating profit at time t is:

$$\text{Operating Profit}_t = \sum_{time=t} \text{Gross Profit} - \sum_{time=t} SG\&A - \sum_{time=t} \text{Cost of Carry} - \sum_{time=t} \text{Shrink}$$

Where, Gross Profit =

$$\text{Revenue} - COGS = \sum_{time=t} \sum_{UPC=s} \sum_{UPC=u} M_{st} * \text{MIN}(D_{st}, F_{st}) * OOS_{st} * SUB_{su}$$

Where,
$M_{st}$ is the margin dollars of UPC s at time t which is
$P_{st}$–Cost the retailer pays for the product
$D_{st}$ is the demand in units of UPC s at time t
$F_{st}$ is the forecasted (or ordered and arrived) units of UPC s at time t
$OOS_{st}$ is an out of stock boolean of UPC s at time t
$SUB_{st}$ is the substitutability of UPC s with UPC u $$SG\&A = \text{cost of cashier labor} + \text{cost of stocking labor} =$$
$$\text{cost of cashier labor} + \sum_{time=t} \sum_{UPC=s} CPR * \frac{\text{MIN}(D_{st}, F_{st})}{SC_{st}}$$

Where,
CPR is the Cost per Replenishment, which is the hourly wage of an associate divided by the number of replenishment events they can complete in an hour.
$D_{st}$ is the demand in units of UPC s at time t
$F_{st}$ is the forecasted (or ordered and arrived) units of UPC s at time t
$SC_{st}$ is the shelf capacity in units of UPC s at time t $$\text{Cost of Carry} = \sum_{time=t} \sum_{UPC=s} WACC * F_{st}(P_{st} - M_{st})$$

Where,
WACC is the Weighted Average Cost of Capital
$F_{st}$ is the forecasted (or ordered and arrived) units of UPC s at time t
$P_{st}$ is the retail price of a unit of UPC s at time t
$M_{st}$ is the margin dollars of UPC s at time t
Shrink is the difference between the book inventory (what was received+what is currently in inventory less what was sold) and the physical inventory (actual on hands). This difference can include theft, breakage or spoilage not accounted for, wrong product received from central or DSD (Direct Store Delivery), wrong product rung up at the register either by cashier error or ticket switching, and anything else that can cause these two systems to go out of sync. This is a function of the amount of inventory you have in the store.

$$\text{Shrink} = \sum_{time=t} \sum_{UPC=s} P^{shrink}_{st} * F_{st}(P_{st} - M_{st}))$$

Where,
$P^{shrink}_{st}$ is the probability that UPC s gets stolen, broken, or otherwise at time t
So we have the following maximization problem that our system will attempt to learn how to optimize:

$$\text{MAXIMIZE}\left(\sum_{time=t} \text{Gross Profit} - \sum_{time=t} SG\&A - \sum_{time=t} \text{Cost of Carry} - \sum_{time=t} \text{Shrink}\right)$$

subject to $F_{st}$ and $SC_{st}$ $$\text{MAXIMIZE}\left(\sum_{time=t} \sum_{UPC=s} \sum_{UPC=u} M_{st} * \text{MIN}(D_{st}, F_{st}) * OOS_{st} * SUB_{su} - \right.$$
$$\sum_{time=t} \sum_{UPC=s} CPR * \frac{\text{MIN}(D_{st}, F_{st})}{SC_{st}} - \sum_{time=t} \sum_{UPC=s} WACC * F_{st}(P_{st} - M_{st}) -$$
$$\left. \sum_{time=t} \sum_{UPC=s} P^{shrink}_{st} * F_{st}(P_{st} - M_{st})\right)$$

subject to $F_{st}$ and $SC_{st}$

SUMMARY OF THE INVENTION

The invention provides an automatic, computer-driven way to solve this problem and get better results each day. By posing this as a non-convex optimization problem, and solving it using stochastic gradient descent and Reinforcement Learning, we can teach a computer to run a store better than a human and find the optimal solution. The algorithm may take into account the following "input vectors" as input $M_{st}$, $D_{st}$, $OOS_{st}$, $SUB_{su}$, CPR, WACC, $p^{shrink}_{st}$, and $P_{st}$. It may take more such as weather patterns, the stock market, traffic patterns, data from other nearby stores, etc. Then the algorithm runs and produces an optimal planogram $SC^*_{st}$, the optimal forecasting $F^*_{st}$, and the optimal Labor Schedule $L_t^*$ and any other values that the optimization method has the ability to optimize over, such as Price to charge per UPC. We can perhaps get the optimal stocking Labor Schedule from those values by:

$$L_t^* = \sum_{UPC=s} \frac{MIN(D_{st}, F_{st})}{SC_{st}}$$

We also get the UPC replenishment task prioritization by:

UPCs to work in order=$Sort_{descending}(M_{st}*MIN(D_{st}, F_{st})-OOS_{st}*SUB_s)$ While many of the variables in this formula are known, a few are not easily known today:
1. We must know $OOS_{st}$ (what is OOS and what is not)
2. We must know $SUB_s$ (what is substitutable and what is not)
3. We must know $D_{st}$ (what is the demand for each UPC and at what time) We discuss below how to compute these values and how the system works.

Measuring Out of Stocks and Planogram Compliance Hourly

To measure $OOS_{st}$, we deploy cameras on a shelf that take an image once an hour, predict <time, location, upc, in/out/low, planogram noncompliant True/False> for all upc-locations in the store.

From each image, we calculate a status for each location-UPC pair on the shelf. The possible statuses are in stock, out of stock, or low. We also compute whether or not the location-UPC pairing is correct or not, or planogram non-compliant, meaning that the planogram (or shelf specification) calls for UPC 1234 at location 254332. If at that location we detect a product that is not UPC 1234, we would call this planogram non-compliant. The output is <time, upc, in/out/low, planogram noncompliant True/False>.

The Reinforcement Learning model would first learn over many pairs of input state, output action, and delivered reward to find optimal Q-values for each state-action pairing. Each Q-value is the expected discounted reward for performing that action when in that state. These values are learned and tuned with experience and are seldomly hand engineered, but they can be. The reward can be whatever the store wants to optimize for. If they want to increase customer satisfaction, they can look at end of shopping trip survey scores and aim to optimize this as the goal, with higher customer satisfaction being a positive reward, and lower NPS scores being a negative reward. If profitability is the goal, then they can use the true Operating Profit at the end of the day as the reward, with higher Operating Profit as a higher reward and lower Operating Profit as lower reward. This may also be a mix of many objectives summed together, increasing a tuning parameter to increase the important of one objective over another.

The states could be the state of the store such as where products are and what is in stock and out of stock, it could be the weather, it could be many things. The actions could be SC, F, and L from above. It could be the prices the retailer charges per UPC. It could be many things. Since the cardinality of all states and actions is infinite, the Q-values in Deep Reinforcement Learning are estimated with a Deep Learning function that may be a Multi-Layer Perceptron, Convolutional Neural Network, or otherwise. The Deep Learning function is trained to produce more and more accurate Q-values over time as the retailer uses the system more and more to provide an optimal policy or set of actions given a specific state of the store.

DESCRIPTION OF THE DRAWINGS

FIG. 16 shows a predicted optimal store schedule for employees.

FIG. 19 shows a daily summary that can be presented regarding employees' completion of tasks, open priority tasks and potential increased revenue by completing those tasks.

FIG. 20 shows a report that indicates store rankings and employee (associate) rankings as to which are performing best.

DESCRIPTION OF PREFERRED EMBODIMENTS

Figure 1:
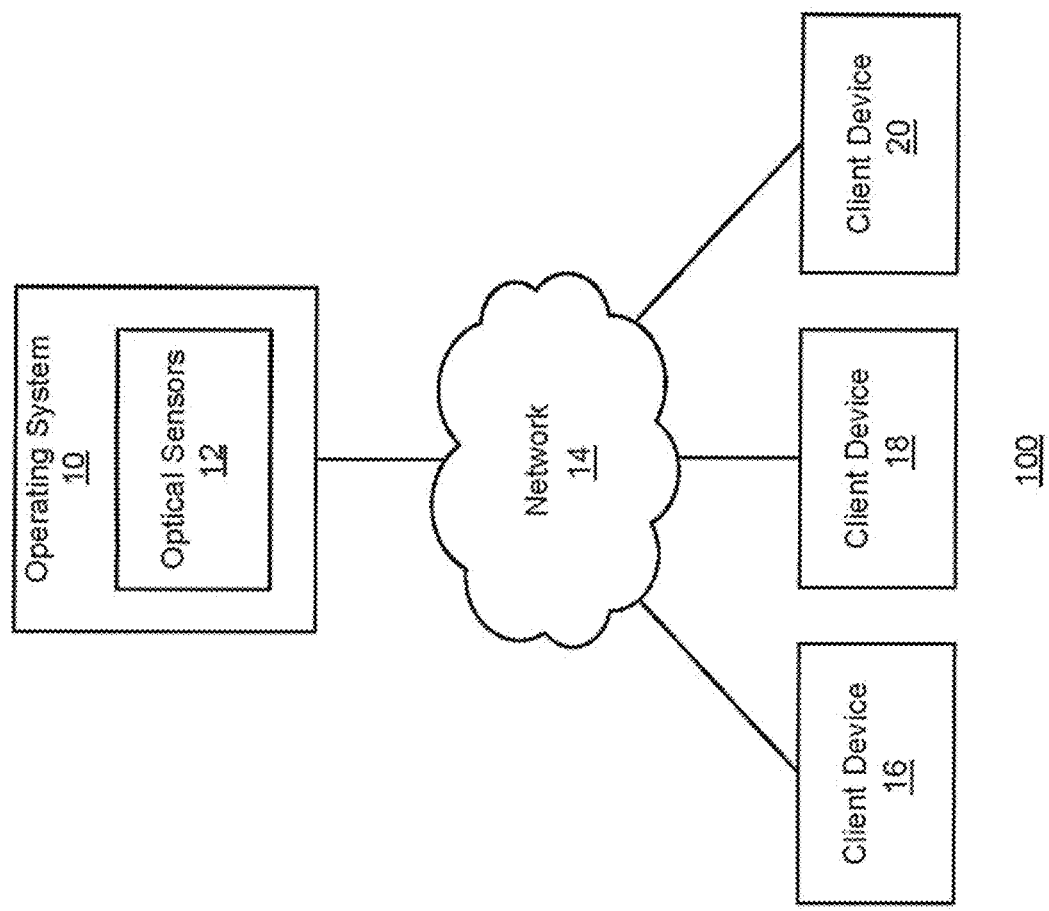
FIG. 1 is a simplified diagram indicating the system of the invention.

FIG. 1 is a schematic overview diagram indicating the system of the invention. The operating system 10 includes a multiplicity of optical sensors 12, i.e. cameras that are conveniently and inconspicuously located on shelves across the aisle from shelves full of stock being imaged. Although the cameras/sensors are in the stores, they are part of the operating system. Preferably a store includes a sufficient number of cameras 12 to image all stock shelved in the store. The operating system 10 is connected via a network 14, which could be a WiFi network or could involve remote communication via Internet, to a series of quiet devices 16, 18 and 20. The devices can be desktop computers, laptops, tablets, smartphones or other portable computer devices.

Figure 2:
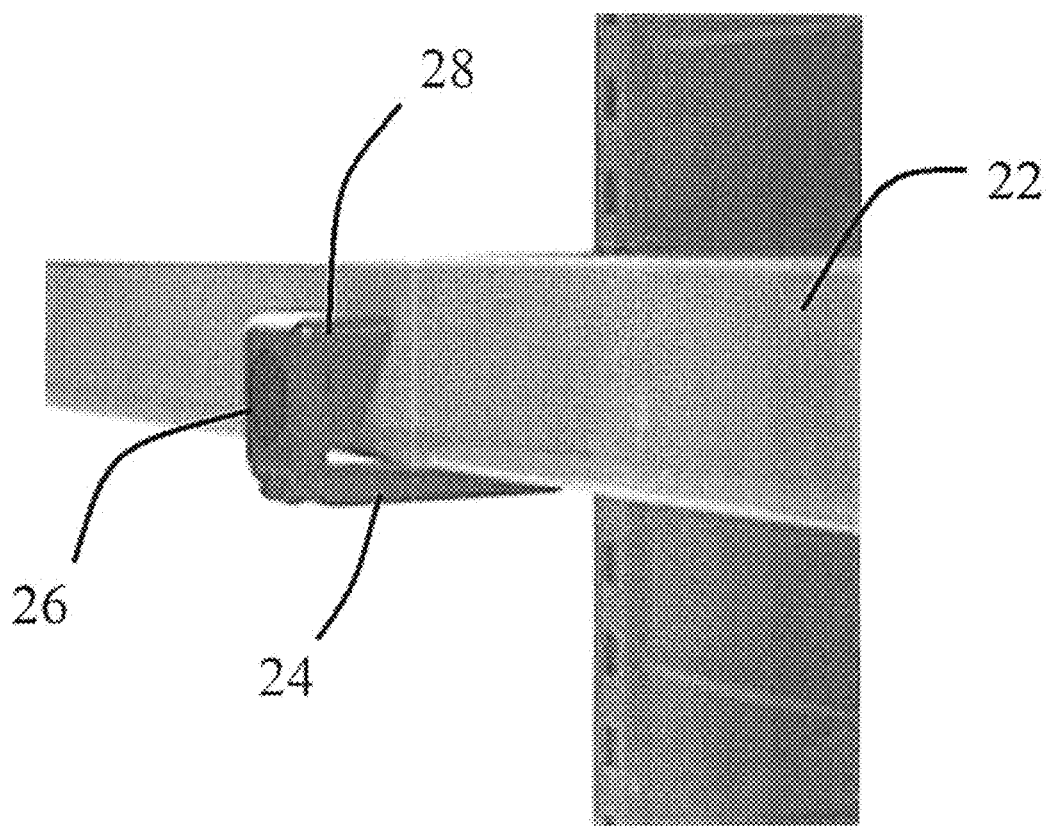
FIG. 2 is a perspective view showing an example of camera placement on a shelf in a store.
Figure 3:
FIG. 3 is an example of an image taken by a camera from across an aisle from shelves displaying products.

The cameras can be, for example, as shown in FIG. 2, and they can take images as shown in FIG. 3. FIG. 2 indicates a store shelf 22, and including a bracket 24 supporting a small camera or optical sensor 26. A view of the camera is across the aisle, and it may produce an image such as, for example, shown in FIG. 3.

The cameras are placed every 4-12 feet depending on the resolution required and the point of view required. Each camera 26 has a shelf mount 28, a lens, a camera module, and a wire that goes to a communications box (not seen in FIG. 2). Each communication box has a battery, a wifi communication chip and a board that turns on the camera.

Figure 4:
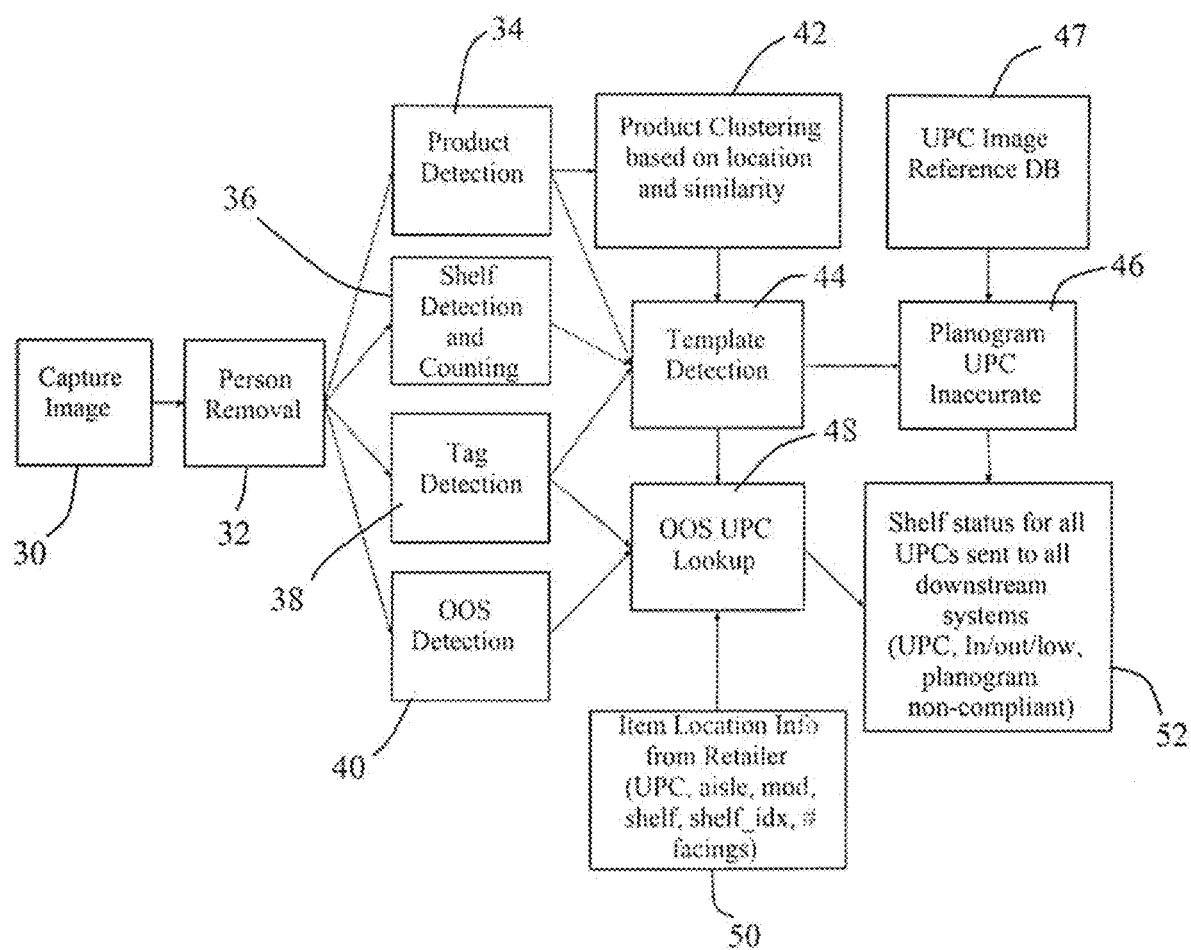
FIG. 4 is a basic flow chart showing procedure in processing data that originated from image capture.

The algorithm of the system operates as indicated in FIG. 4, an overview illustration. Image capture is indicated at 30. The software removes any part of a person showing in an image, as indicated in the block 32 and as further discussed below. The software then analyzes the image of items on the shelves, detecting products (34), detecting the shelf position of each product (36), detecting a tag on the product if possible (38) and detecting an out of stock condition for any item, indicated in the block 40. As further indicated in the drawing, the programming "clusters" products based on location and similarity, as at 42, analyzes the template of products viewed in the image (44) so as to compare with the planogram for those shelves, indicating if a template is inaccurate, as at 46. This determination is aided by a reference database 47. If an item is out of stock (48), the UPC for that position is looked up, using item location information (50) from the retailer's database. Finally, the determined information is sent to all downstream systems for appropriate action, as at 52. These statuses include the UPC identifier, in/out/low stock information, and the fact of planogram non-compliance, if this is determined.

Figure 5A:
FIGS. 5A and 5B show shelf capture images and out of stock or low stock conditions.
Figure 5B:
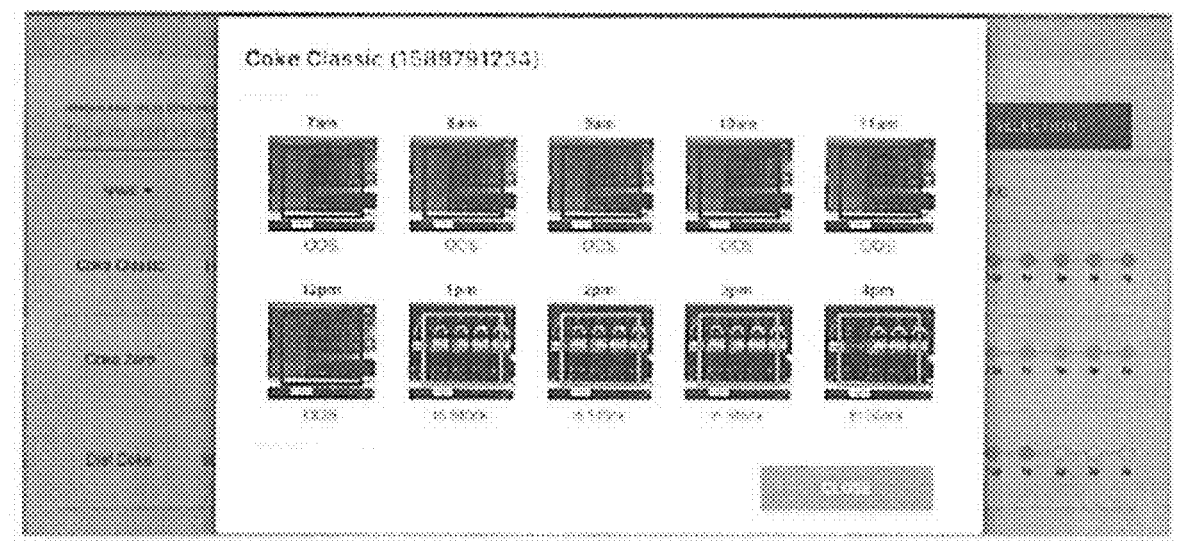

FIG. 5A shows that the shelf cameras capture images of each shelf, the images then being analyzed by the system's deep learning algorithms. OOS, planogram compliance, low stock and restocked status are indicated in FIG. 5B. The cameras take images at regular intervals, e.g. hourly, to show exactly when products go out, and when they were actually replenished.

Figure 6A:
FIGS. 6A through 6G show images of products on the shelves and processing of the images and data from the images pursuant to the system of the invention.
Figure 6B:
Figure 6C:
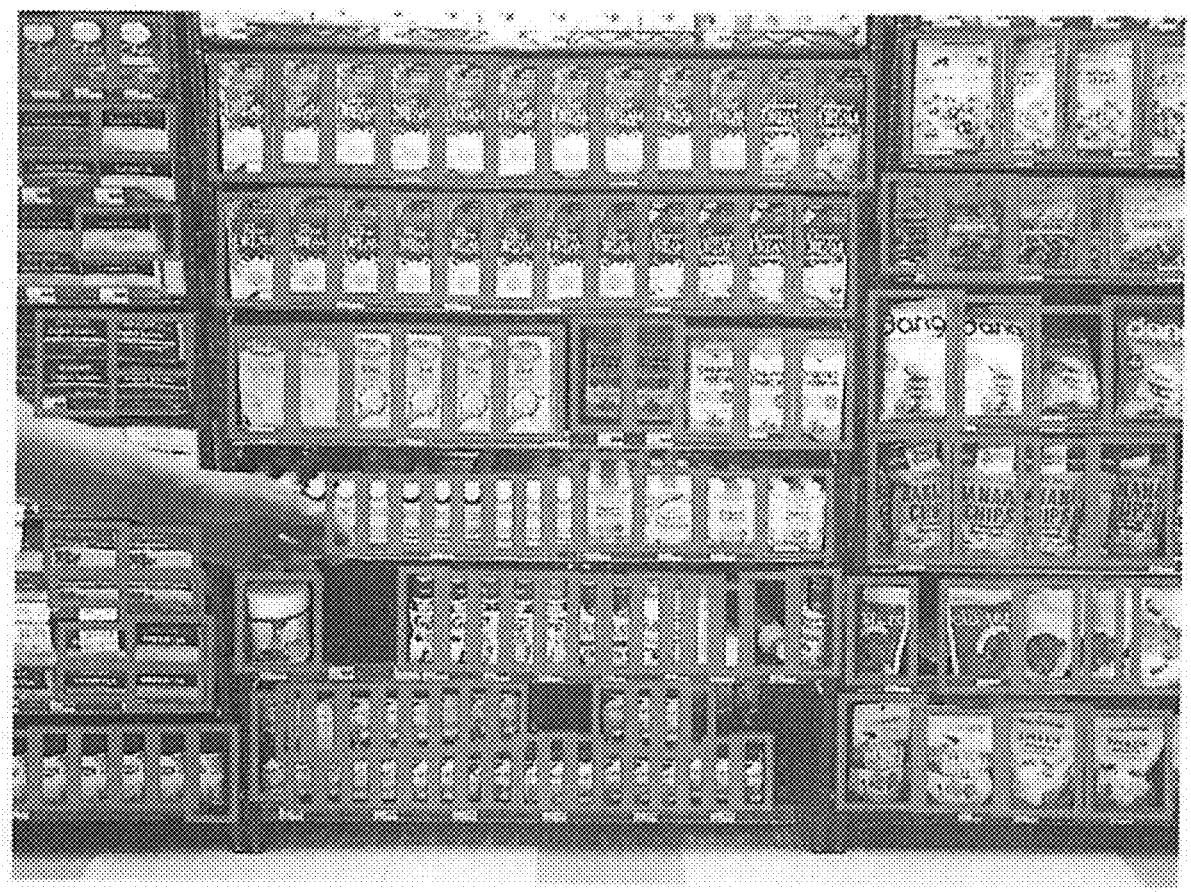
Figure 6D:
Figure 6E:
Figure 6F:
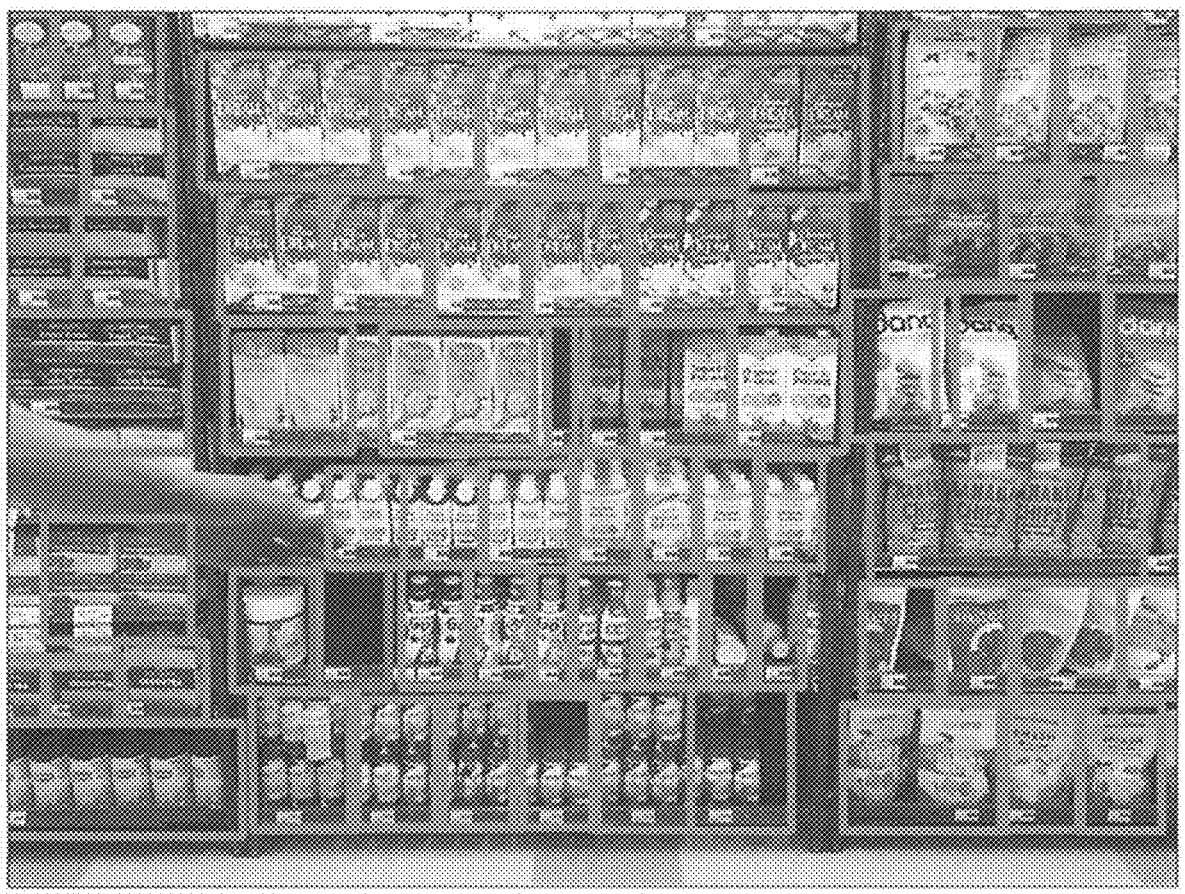

FIGS. 6A to 6G are photographs with indications of some of the processing done by the system to analyze the images. FIG. 6A shows products detected on the shelves, segmentation of the shelf areas to count the number of shelves and allocate each detected product to a specific shelf number. FIG. 6B shows product grouping, to put identical products in each group, based on visual similarity and position so that the system can bucket the products on the shelf into template boxes or facings. In FIG. 6C product bounding boxes have been placed on the products. FIG. 6D shows tag bounding boxes placed on product/price tags below the products, to ensure there is a price tag for each unique product on the shelf and that it is at the correct location. FIG. 6E shows position of bounding boxes in particular for empty shelf positions where products are out of stock. In FIG. 6F is a template ensemble. A template has been detected of the arrangement of products on the shelves so the system knows what product is supposed to go where, so that when the system sees an out of stock, it knows what product to order more of or to alert the staff to restock. All this information can be combined to infer if the shelf is executed to a specific plan or planogram that the store is supposed to maintain.

Figure 6G:

In FIG. 6G, in order to protect people's identities, person detection is illustrated, with the arm of a person detected in the image and the pixels removed, i.e. blacked out. If the sensor is high enough resolution, the price information, SKU, UPC, and barcode can be parsed to ensure the price the customer sees is the correct price. Discount tags can also be parsed this way.

Measuring Substitution, $SUB_{s1\ to\ s2}$:

To know how substitutable each product is we can measure the change in expected sales in $SKU_1$, when $SKU_2$ is out of stock, $SUB_{s1\ to\ s2}$=E[% change in sales of SKU1/SKU2 being out of stock] If this is zero, then there is no substitution effect, and the lost sales in that SKU being out of stock is not being made up by sales in other SKUs, which is bad for sales. However, if that number is greater than zero, that means there is a substitution effect and we are okay being out of stock in s2 since s1 will compensate for it, or if big enough, completely eliminating that SKU from the planogram. Imagine for example Poland Spring water and Dasani water. Most consumers would not prefer one to the other, and if one were out of stock, the sales of the other would increase. If on the other hand $SUB_{s1\ to\ s2}$ is negative, that means there is a complementary effect happening, like hot dog buns and ketchup. If the store is out of stock on hot dog buns, then a consumer probably will not need the ketchup either so the store does not want to be out of stock on either. This increases the importance of being in stock on this SKU. Since the stores today do not know very accurately what is in stock and what is not, this is impossible to measure without shelf cameras or something equivalent. Note, the SUB matrix from one store to another may be different as different demographics may have different buying habits. And this SUB matrix may also change over time as buying habits change over time. For example, if Mojitos are in fashion, then being out on mint may cause a negative SUB value for limes. As this falls in fashion, this will return to zero.

By knowing $SUB_{s1\ to\ s2}$ for all pairs of SKUs, we can more accurately predict what the effect of eliminating SKUs would be. This is called SKU rationalization which has huge implications for Operating Profit. For example, if it costs $1 m a year to have a SKU in the supply chain, and if we currently have 50 ketchups in our planogram, and we measure that the substitution between one SKU to all the other SKUs is very high and the category's sales did not decline, that means that that SKU can safely be eliminated from the planogram since customers do not have loyalty to that product and would substitute it out without complaint.

Measuring $D_{s,t}$:

To predict the amount of product demanded at time t for each SKU), we need more than just the transaction log/scan data as is used today. Demand depends on many factors that can alter demand like the weather, the historical movement, the sales price, the stock market, a looming pandemic, the product attributes, the health risks of that product (or deemed health risks), the advertising of that product, merchandising, the competing products on the shelf, competitive prices, a store opening up next door with cheaper prices, etc. Trying to use this much input data to make such a demand prediction with a linear model (like linear regression) is sure to fail, but this is where deep learning algorithms and Reinforcement Learning in particular can perform very well. In one instantiation, we would pose this as a supervised learning problem or a reinforcement learning problem, where, in both cases, we are iteratively predicting what expected demand, stock to that level, and then compare that to what true demand was later. We know true demand since if the product was OOS we have underestimated demand and if the product was always in stock, we have overestimated demand. The model will retrain itself to minimize this difference everyday and over every store the system is live in, and as it retrains, it will get better every time.

Ensuring Compliance of the Recommendations

One major issue is measuring compliance of the recommendations; such as ensuring people show up on time, that they stock the shelf the right way, that they work at an expected pace.

Since we base our data on images captured of the shelf, our system is able to capture compliance in all of these regards in a much more objective manner than currently possible. Instead of relying on user input, our system can capture this information automatically based on an analysis of the images captured. Possible applications for compliance verification include:

Logging when employees begin their work, as indicated by restocking activity in the respective areas of the store and tying that activity back to the store associate responsible for that area The velocity at which an employee stocks the shelves, as indicated by the number of items restocked in a given period of time Ensuring items that were claimed to have been restocked have actually been restocked, as indicated by comparing items reported by the employee as restocked to the items that were actually restocked as captured by the cameras Making sure that restocked items were put in the right quantities in the right spots on the shelf in line with the recommended layout of the shelf (as further outlined above).

Feedback Loop Every Time Period to Better Predict the Optimal F*, SC* and OP*

Once we have a solution, we will generate a predicted set of F, SC, and L which are used to calculate the predicted Operating Profit (OP*) for the next time period (likely for the next month). After that time period posses, we will get the true Operating Profit (OP*). The difference between the predicted and true Operating Profit (or the L2 norm) is an error signal to give into the algorithm to back-propagate that error signal to all the learnable terms proportional to the derivative of that term in the equation, so that the algorithm will be more correct next prediction.

In one instantiation, this can be posed as a supervised learning algorithm where if this system were deployed over many months or years in many stores, there is truth data to supervise the algorithm to predict better and better. It could also be initially trained in a high fidelity grocery store simulator where there would be tons of labeled input—true output mappings that the model would be trained against before being trained on real data (or in conjunction with) and then that pretrained model would be fine tuned on the real store.

In another instantiation, this would be posed as a reinforcement learning problem that would be initially trained in a high fidelity grocery store simulator to "play the game" of grocery retail better and better, to try to maximize Operating Profit each month in a simulated store, and then that pre-trained model would be fine tuned on the real store. In this way, the environment/state is the store, the store sales, customer satisfaction, etc., the agent is the deep learning model, the action set is (but is not limited to):

1. the Labor (L) with the recommendations of how to spend that labor (what that labor is doing),
2. the Planogram (SC for shelf composition or shelf capacity per sku) which is a mapping of skus and quantities and positions on the shelf
3. the Ordering (F for forecast) which is the prediction of how much to order of each sku and when given the on-shelf availability from the shelf cameras out of stock data and the Inventory Management Systems (IMS) guess of what is in the four walls (backroom, top stock, and sales floor) which is typically wrong by some margin And the reward can be a scalar function of many variables that a retailer might want to increase and decrease. For example, the reward function could be % increase in monthly sales from last year plus Gk. increase in monthly Net Promoter Score from last year minus % increase in monthly Labor Costs from last year. Or it could be more simply % increase in monthly operating profit from last year.

Figure 7:
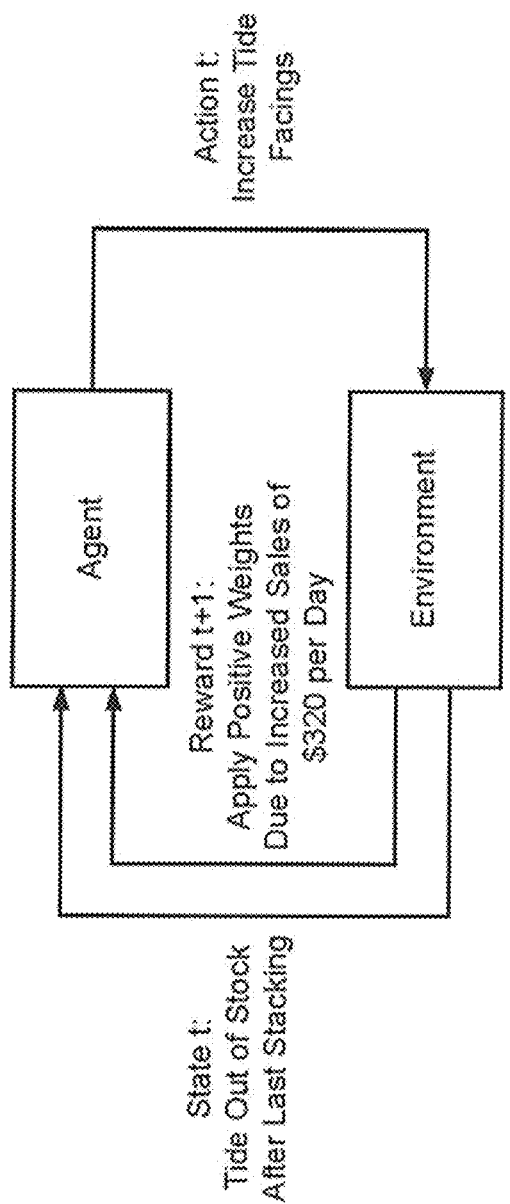
FIGS. 7 and 8 are diagrams to indicate reinforcement learning as applied in the system of the invention.
Figure 8:
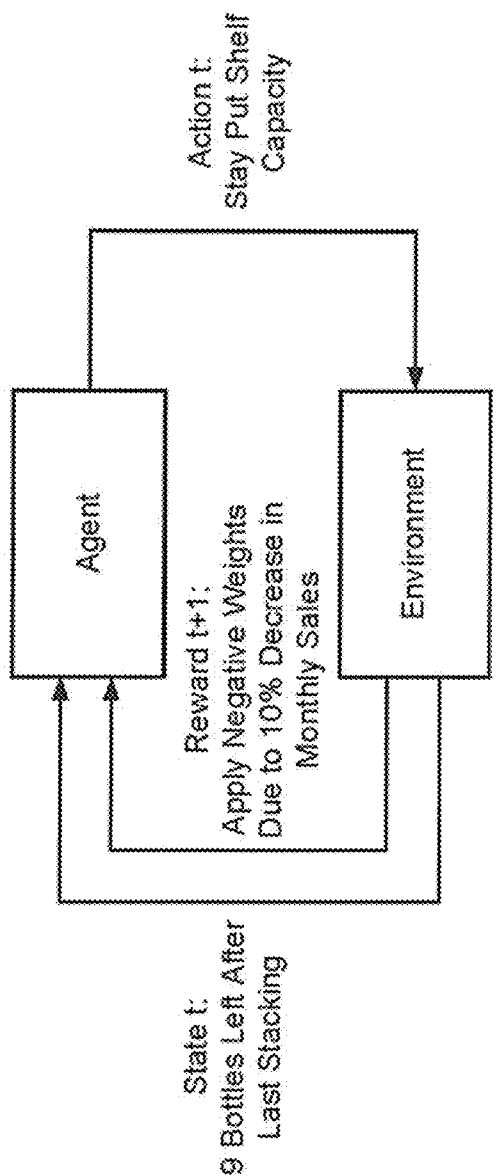

The classic Reinforcement Learning flowchart in FIGS. 7 and 8 shows how one loop through the process would go (perhaps once a month) and the next month the algorithm will get a bit smarter as it realizes the truth reward, and tries to do better the next month. In FIG. 7 an OOS condition of Tide is observed in the first loop. An increase in Tide facings is recommended by the system, and action is taken, resulting in an increase in sales. This generates a "reward", and positive weights.

Utilizing a Simulator to increase the number of training samples:

It is possible to create a computer simulation of a store or set of stores with varying models of consumer behavior, compliance of the associates, labor costs, space in the store, types of SKUs, etc., to attempt to train the Reinforcement Learning model on a plurality of real word events and situations to increase the number of training examples to improve the model further. The more accurate the simulation the more accurate the model would generalize to the real world environment. The model could leverage a mix of simulated examples and real word examples.

A few tangible examples of what could be learned:

Presume in March, we see that Tide goes Out of Stock 30% of days before 5 pm and there is always enough inventory on hand. Our system calls this a "Chronic Out" or an out that happens very frequently. This means that the shelf capacity is too low, and the shelf needs more facings of Tide (more units of Tide when replenished to last the full day). The system will detect this and instantly recommend, as in FIG. 7, to add facings to this SKU and remove facings from another SKU that has never or usually never goes out of stock. Then in April the system will measure that this increased sales $320/day in that SKU and had no effect on any other SKU in the planogram. The system will report the recommended change, the date the action was taken, the result in sales on that SKU, and the result in sales on the category. This will give the store management confidence in the system's predictions.

Another example, presume in March, we see that Tide goes Out of Stock 30% of days before 5 pm and there is never enough inventory on hand. Our system calls this a "Persistent Out" or an out that happens very frequently but there is never anything that store can do about it except order more and wait 2-3 days until the next shipment arrives. This means that the shelf capacity is too low and the order quantity/frequency is too low. The system will detect this and instantly recommend to add facings to this SKU, remove facings from another SKU that has never or usually never goes out of stock, and then add more cases to the order quantity. Then in April the system will measure that this increased sales $320 day in that SKU and had no effect on any other SKU in the planogram. The system will report the recommended change, the date the action was taken, the result in sales on that SKU, and the result in sales on the category. This will give the store management confidence in the system's predictions.

Additional benefits of hourly image detection and machine learning for decision making:

1. Productivity—Depending upon camera utilization (which is the percentage of actions complied with that the algorithm/Operating System produced), we can provide overnight or dayside productivity metrics for given stocking periods. We can compare the number of outs/lows observed before stocking and the number observed after stocking. Overnight metrics can be configured to hourly or every four hours (or other intervals) based on client requirements. This helps retailers track, train, coach, promote, and fire certain employees accurately, promoting employees with high metrics (i e. Fills per hour), and coaching/training/firing employees with bad metrics.

Productivity standards can be developed by category or area of the store and measurements can be recorded at the individual level and reported over time for coaching and improvement. These metrics can also be used to assess the quality of competing SOPs (Standard Operating Procedures). Very often retailers hire Efficient Retail Operations experts, or they employee these professionals internally, to create processes on how to perform work to maximize the output per labor hour. Simply changing the order of operations on tasks can increase productivity greatly. For example, a stocker needs to unload a truck then place all the boxes that belong to each aisle on their own trolley. Once that is full they bring the trolley to the aisle. Then they cut open the first box, put down the knife, unload the box, and then restock those items on the shelf. And then repeat. However, they spend a lot of time trying to find the knife again and again. It would be much faster if they cut all the boxes open first, then put the knife away for the night. This little idea can lead to millions of dollars of saved labor hours "trying to find the knife". With our data, we can measure exactly how much more productive that labor is measured as number of fills/labor hours.

2. Recovery—Through deployed fixed shelf cameras and Computer Vision, we can determine where there are messy shelves that need attention or identify flaws in merchandise presentation by the retailer (Planogram Compliance). Using image detection to identify when an area needs attention (merchandise falling over, misaligned shelves, product fallen and gathered at the bottom of a section), alerts can be sent to address the areas most in need of recovery. And we can detect how long the issue takes to fix per store, per instance, and per associate.

3. Feature low % alerts—Through deployed fixed shelf cameras and Computer Vision, we can identify fill levels on feature or promotional areas that don't follow a fixed plan-o-gram but are set to presentation level. The Computer Vision detects when products in these areas falls below 75% (customized by retailer) and sends alerts to store management of low areas in the store to fill.

4. Loss prevention—Very often, large theft events occur by a team of people that hit many stores in a short amount of time and wipe out high value and easy to resell items like razors, baby food, and red bull. They will wipe out the entire shelf in one go and then walk right out of the store without paying. Today, retailers do not realize this happened until sometimes months after when they take the full store inventory and realize the product has been missing from the store.

Using our shelf camera data, we can look at time frames of when a high value product transitions from fully on-shelf to completely out of stock, coupled with POS sales data to assess whether there was a purchase or not, can assist loss prevention associates in narrowing down time frames of when fraudulent activity is occurring and reduce time spent reviewing hours of video. We can provide insight into patterns across categories and geographic regions within the day to aid in decision making and action planning to reduce or prevent these losses quickly to alert all nearby stores and the police.

5. Field management view of problem areas/stores, compliance, recommended actions, and the results of those actions—Our system includes dashboard reporting for all insights gained from shelf detection that can be used to follow up and address chronic problem stores.

6. Planning and allocation sku level insights—SKU analytics derived from shelf availability statistics by store allow for buying and allocation by individual store need. Product needs are integrated into the ordering process to auto-trigger replenishment from pool stock or the vendor.

7. More accurate IMS—Physical inventory counts are the most accurate method of matching the book inventory to the actual on-hands, but this is an expensive and time consuming process. The further that a store gets from the physical count, the larger variance to inventory on record. Although the dollar difference can be as low as 1%, the sku difference can be as high as 20%, meaning that although the financials are in line, the store does not have what the system thinks it should have or more importantly what the customer wants to purchase. Our system can automatically correct inventory when all the cameras that are monitoring that item do not see that item. The system knows it is out of stock, identifying "ghost inventory" and zeroing it out automatically.

8. Third Party Vendor Management—Allows the retailer to see when direct store delivery (DSD) vendors are within plan-o-gram compliance and when they are filling outs with extra facings of a similar product. It is also good to know when the DSD vendor arrives and leaves (our cameras capture this as well). This gives the retailer real time analytics of when and how the DSD vendor is replenishing product so the system can catch issues and better inform them on when to come and when not to, and what to do when they are there. DSD CPGs would likely want this information and would pay for it. In one instantiation, we would sell this data to the CPGs. In another, we would have an agreement with the retailer and let the retailer sell this data to the CPGs.

9. Decrease Prices of fruit and meat at the end of the day—The system can learn certain pricing strategies and feed those updated prices to Electronic Shelf Labels such as noticing that certain product is about to spoil, and to decrease the price of it to inspire consumers to purchase it at higher demand levels.

Figure 9:
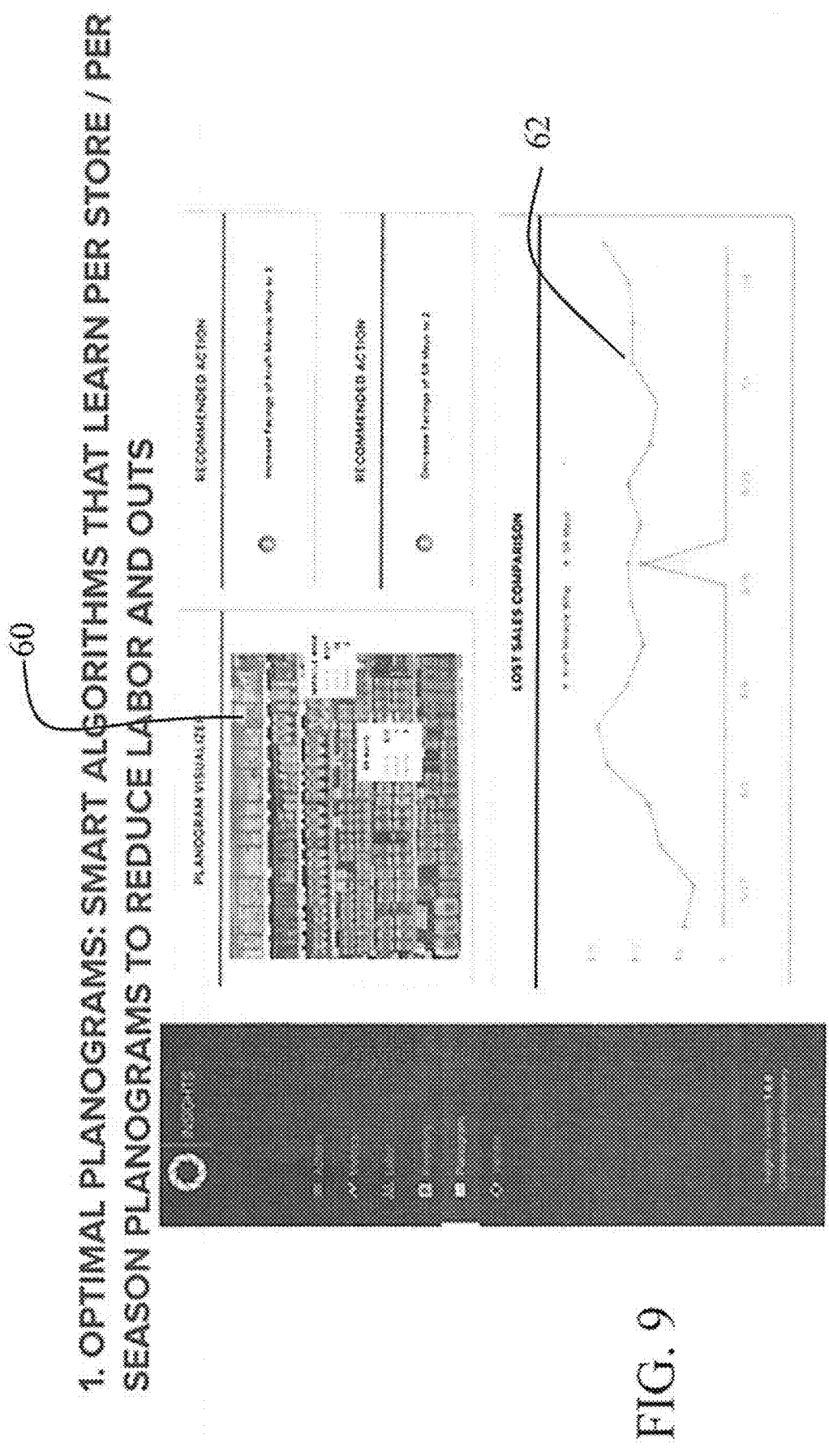
FIGS. 9, 10, 11 and 12 show examples of screen presentations created by the system of the invention, for optimizing planograms and ordering, and optimizing labor scheduling for best use of labor.

FIG. 9 illustrates some aspects of the system. A planogram visualizer 60 indicates projected lost revenue from out of stock conditions that have occurred over a period of time for two types of mayonnaise. This might be, for example, over a period of a month. One of the products, Miracle Whip, experienced chronic-out conditions, and had only two facings on the shelves. The competing product only experienced one of out of stock instance, and had three facings. The recommended action is to increase facings of Miracle Whip to three, while decreasing facings of the other product to two. This is also shown on the graph 62, for lost sales of the two products shown over a period of about two months. The lost sales numbers are calculated, projected from the number and duration of out of stock conditions of a product. As noted, the system employs smart algorithms that learn per store and per season, to adjust planograms to reduce outs and labor costs.

Figure 10:
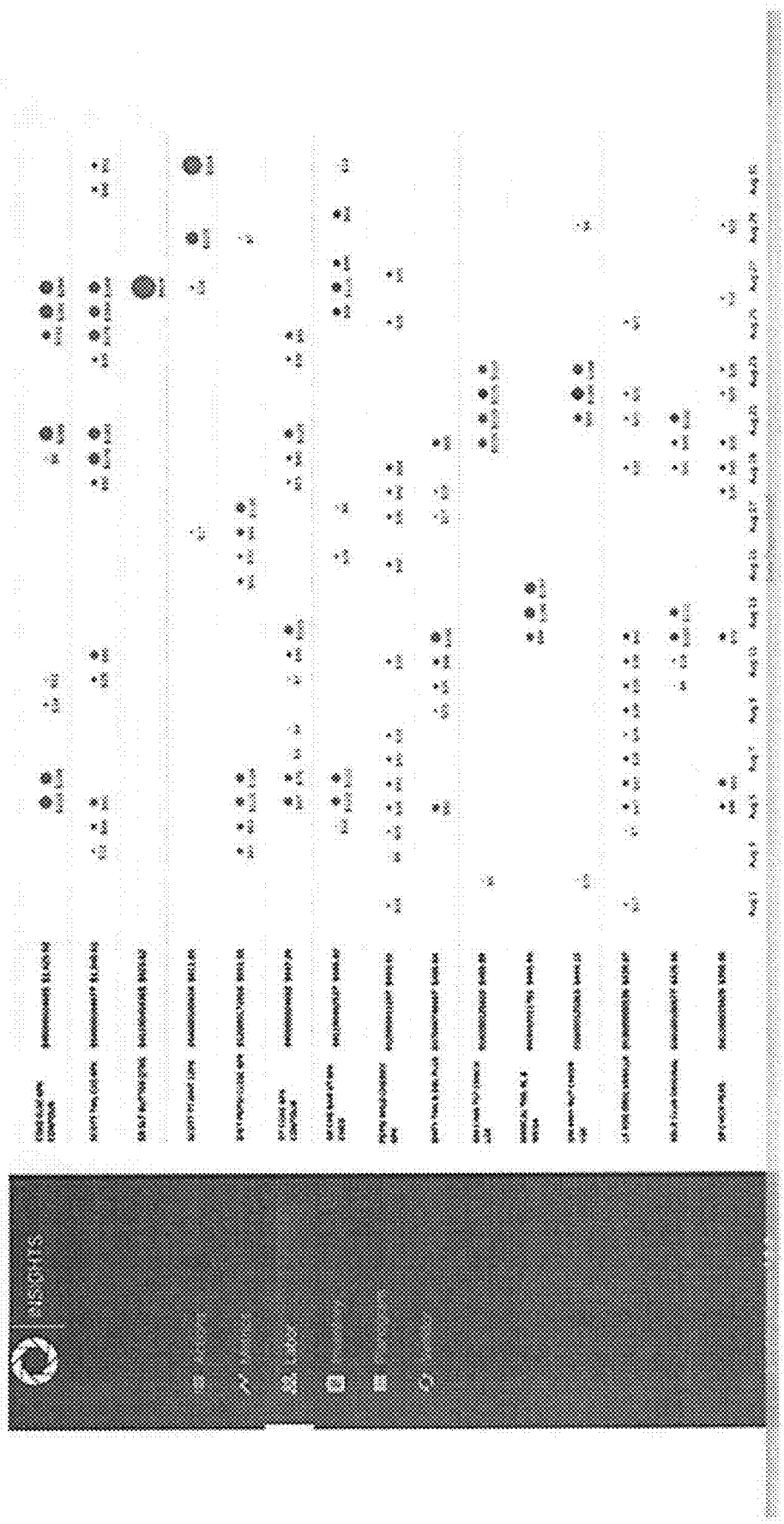

FIG. 10 is a chart indicating an example of certain products of a store and a projected optimal ordering quantity, over a period of one month. Through reinforcement learning, the system projects these numbers to reach the optimal ordering quantities for various products, striking a balance of reduced inventory and high on-shelf availability. The larger red value shows the larger amount of lost sales lost because of that product being out of stock for that time period. This amount is sought to be reduced, and the AI can come up with labor models and prioritization for it to attempt to do so, measure the result, then try to do so even further, measure the result, etc.

Figure 11:
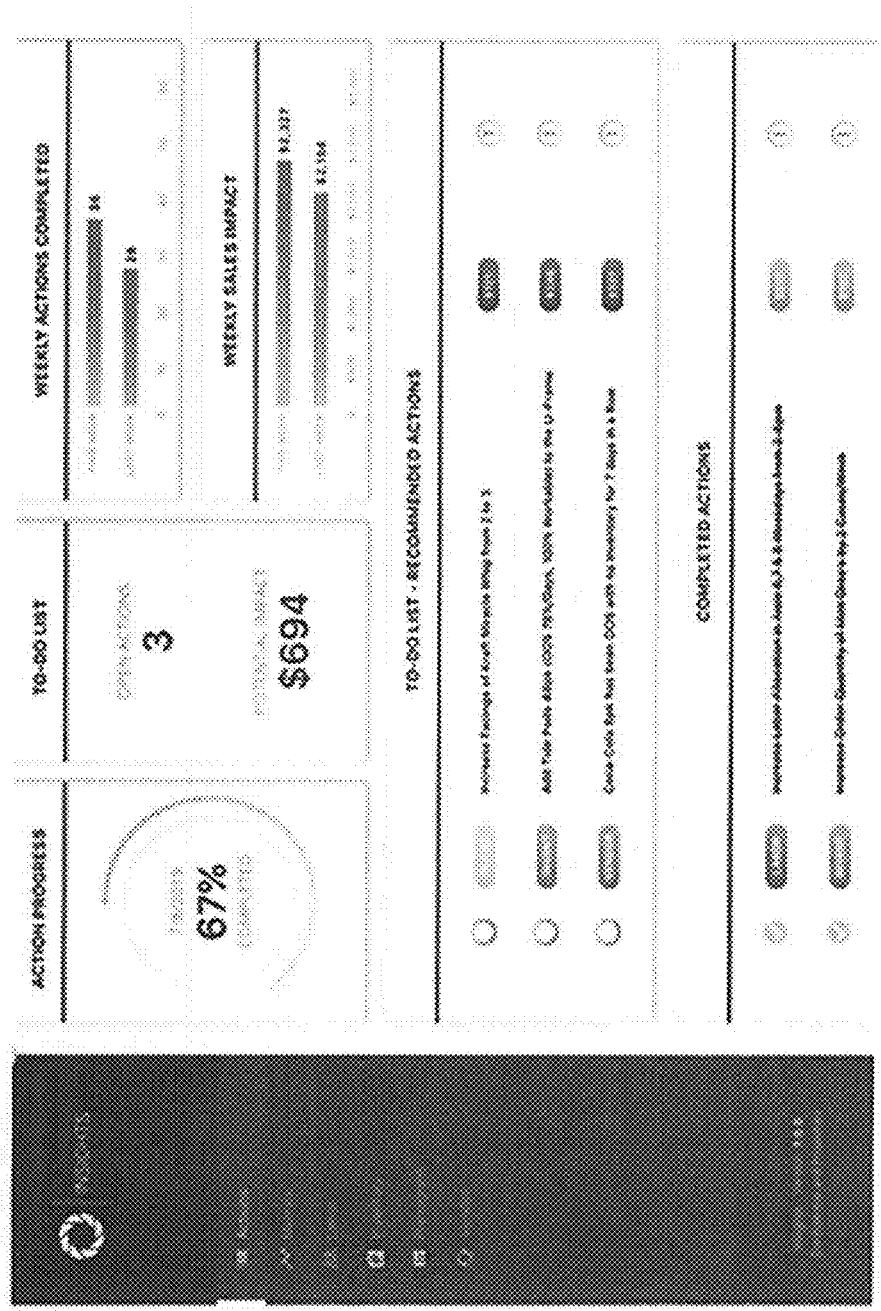

FIG. 11 simply indicates compliance by store labor with actions recommended by the system. As explained above, these are derived from camera data and out of stock or low stock conditions over time, with the system learning to be more accurate with reiterations and checking results over time. The monetary effects of the compliance with recommendations are indicated, as are the potential operating profit and gain of completing actions which have not yet been completed.

Figure 12:
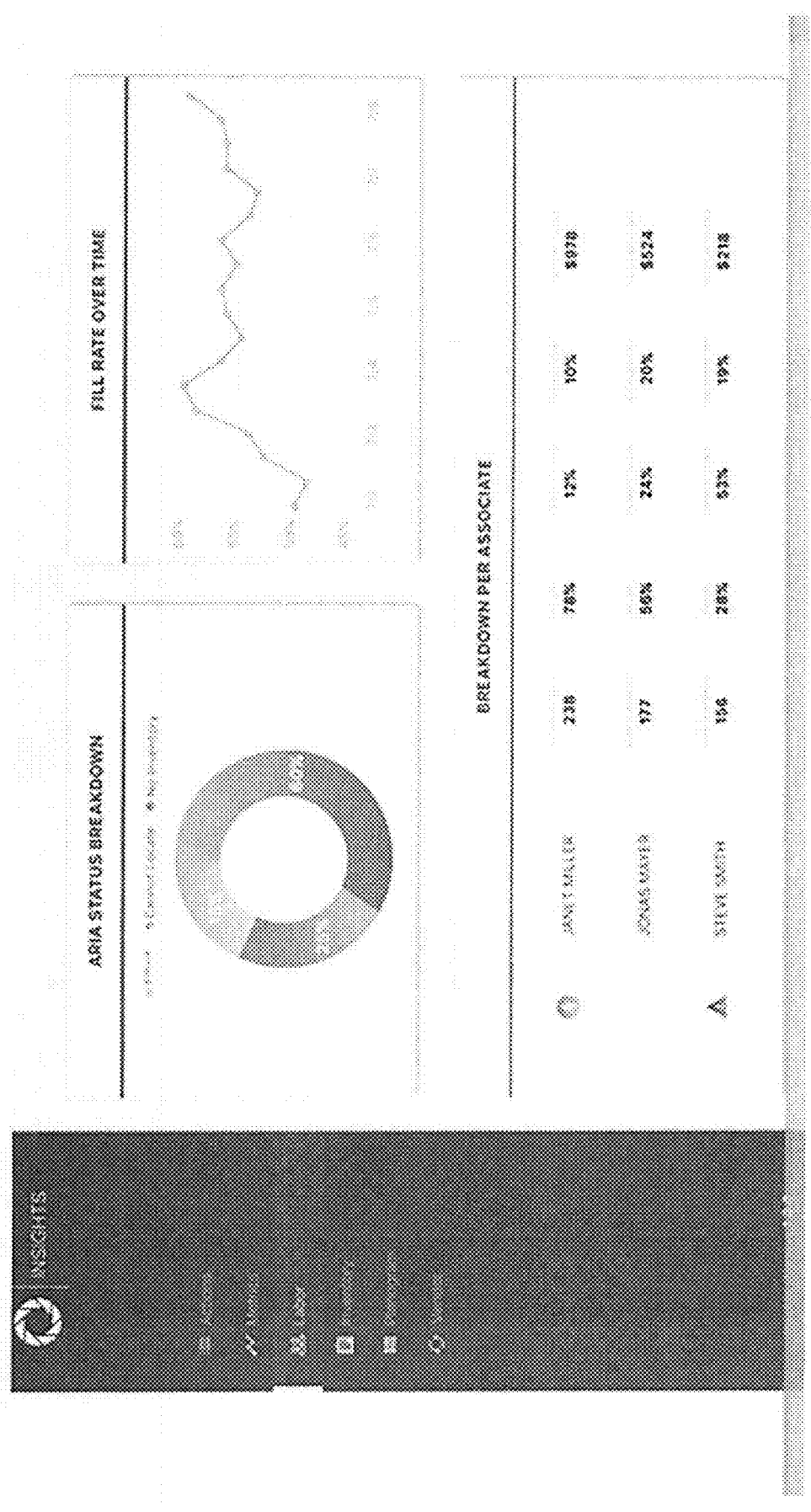

FIG. 12 is another chart regarding performance by labor, i.e. store employees.

Figure 13:
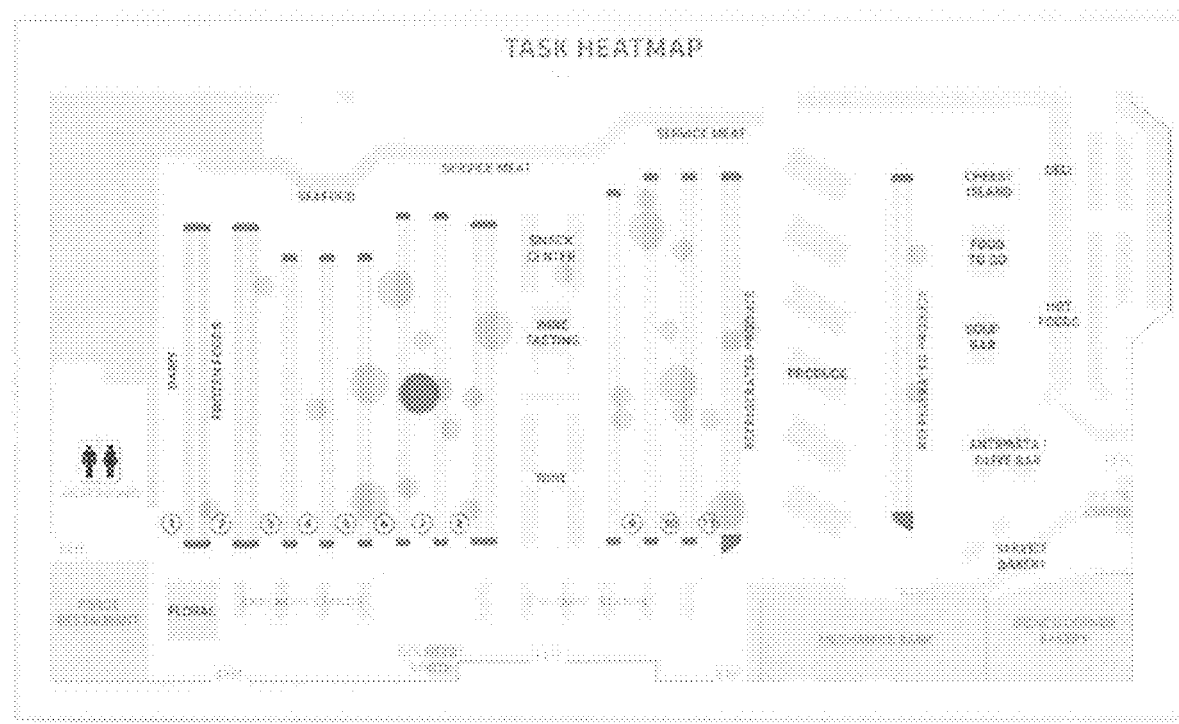
FIG. 13 is a plan diagram of a particular store, indicating areas that need attention.

FIG. 13 shows a schematic of a store layout, with aisles and different product areas indicated, as a "task heat map". The graphic shows example areas of the store with problems detected by the system of the invention, presented to the store operator or management. This is one example of the aggregate reports, emails, texts, dashboards and other reports for store staff and corporate users to see and monitor key metrics.

Figure 13A:
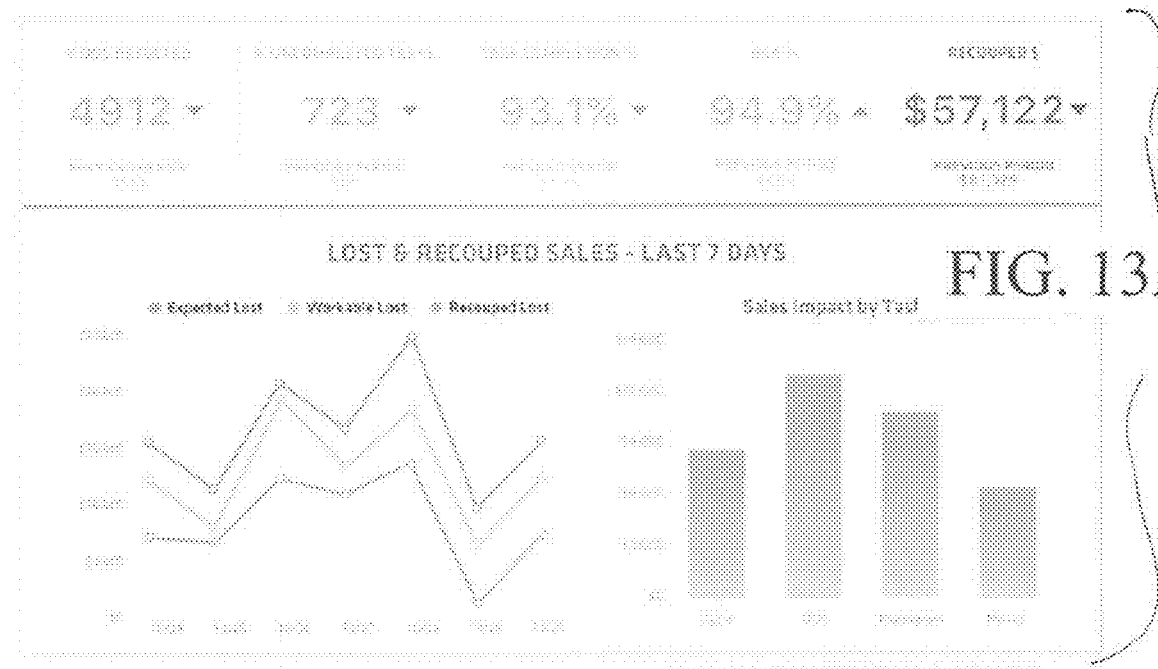
FIGS. 13A and 13B show reports and summaries that can be presented by the system of the invention.
Figure 13B:

FIG. 13A shows an example of a report of OOS detected, uncompleted tasks, completions by percent, on shelf availability percent, and recouped this period due to task completion. The line graph shows lost and recouped sales for a period including expected lost and recouped lost, workable meaning the product has inventory in the backroom or on top-stock, i. e. potential lost sales that could easily be corrected. The diagram is intended to give the store operator an overview of where problems exist, which the system can remedy if the employees comply with the system's recommendations. FIG. 13B shows information presented on an employee's smartphone or tablet computer.

Note that the system may indicate "negative on hands" for some items that the inventory Management System (IMS) believes that it has a negative amount of product in the store. This is obviously wrong. This happens when the store orders 10 units of UPC1, but 10 units of UPC2 get delivered. Assuming the store had no inventory of UPC2 before (IMS showed UPC2=0), then the IMS will increase on hands for UPC1 by 10, but over time will sell 10 units of UPC2. It will show as −10 in UPC2. This is a clerical error that the system can pick up and automatically start looking for the UPC1 that is too high now by scanning the store for excess inventory.

Figure 14:
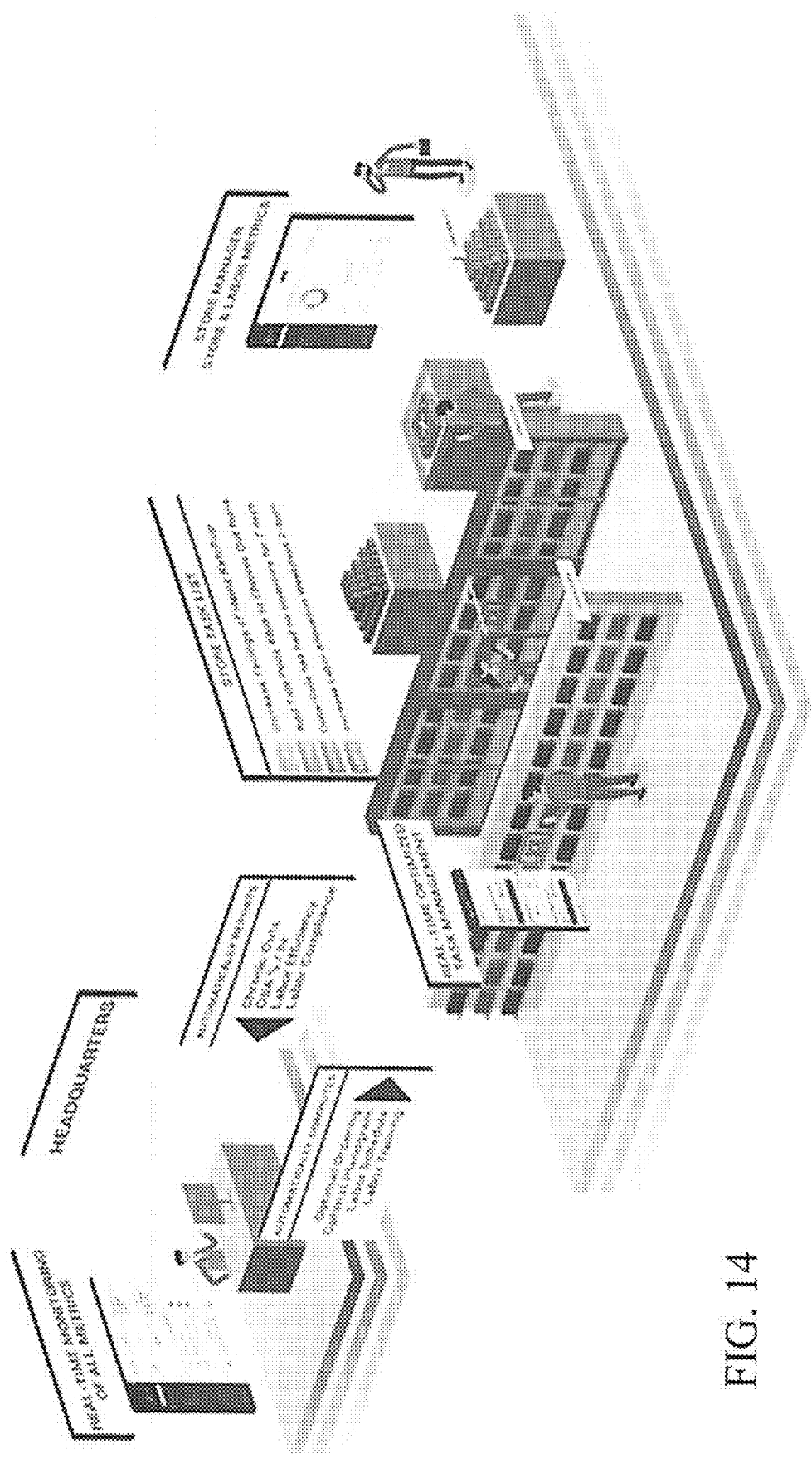
FIG. 14 is a schematic perspective view indicating flow of information and setting of tasks pursuant to the system.

FIG. 14 is a store graphic indicating flow of data, recommendations to be carried out ("Store Task List"), flow of reports regarding outs, computation of optimal ordering, optimal planogram, labor schedule and labor training, and task management. The graphic diagram indicates employees carrying out the recommended tasks.

Figure 15:
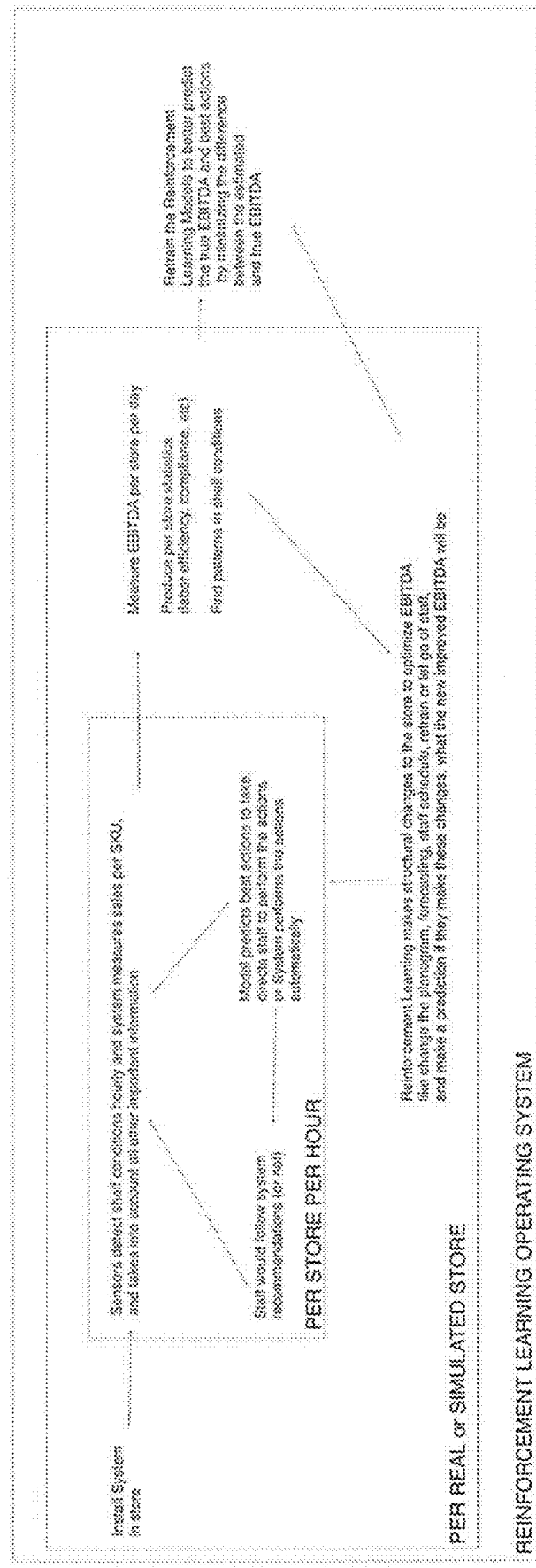
FIG. 15 is a flow chart showing processes of the system of the invention.

FIG. 15 is an overview flow chart showing system operation. For each store the system is installed in, the system collects, measures and detects state information of the store (such as in-stock, out of stock, low stock, high stock, misplaced product, planogram compliance, spoiled, aged, or broken product, incorrectly placed price tags, missing price tags, sales per product per unit time, restock rates, labor efficiency per employee, employee compliance to tasks, EBITDA (i.e. Earnings Before Interest, Tax, Depreciation, and Amortization, and more) and combines that with perhaps external information (such as information from other stores, the weather, the stock market, local news, local traffic patterns, etc.) and uses that information as input that is collectively called the "state vector" into the Reinforcement Learning Model to predict the optimal action to take given that state. The System will automatically perform these actions or if it requires manual labor or approval, alerts store staff to perform the action (such as restock a product, or fix a product, or order new inventory). The System will detect if the action was completed correctly, when, and at what rate to ensure the store staff is working diligently and quickly. The store then measures the "state vector" again. This repeats hour after hour throughout the store.

At the end of a 24-hour period, the System measures specific metrics that the store wants to maximize or minimize. There may be many goals such as optimizing on-shelf availability, customer satisfaction scores, or cost of sales (labor cost/sales). Assuming the goal is to maximize EBITDA, at the end of a 24-hour period the System integrates with the Point of Sale system and the Human Resources and Staffing system and Inventory Management System to provide a full picture of how profitable the store was by calculating the store's one day actual EBITDA, the actual reward. The system will compare its predicted EBITDA for that day given the actions that it took compared to the actual EBITDA. The system will retrain itself if the difference between predicted and actual is greater than zero for it to predict more accurately next time.

The System will then take all the historic data of the store and perhaps other stores and find patterns and predict optimal structural actions for the store to take to change structural aspects of the store like the products the store carries, the layout of the store, the location of each products, the price of each product throughout the day, the portion of the shelf allocated for each product, the labor schedule, the labor levels per role per hour, what employees to hire, what employees to retrain, what employees to fire, how much to pay each employee, the prioritization of performing certain actions when, the amount of safety stock to hold in the back room, etc.

Figure 16:
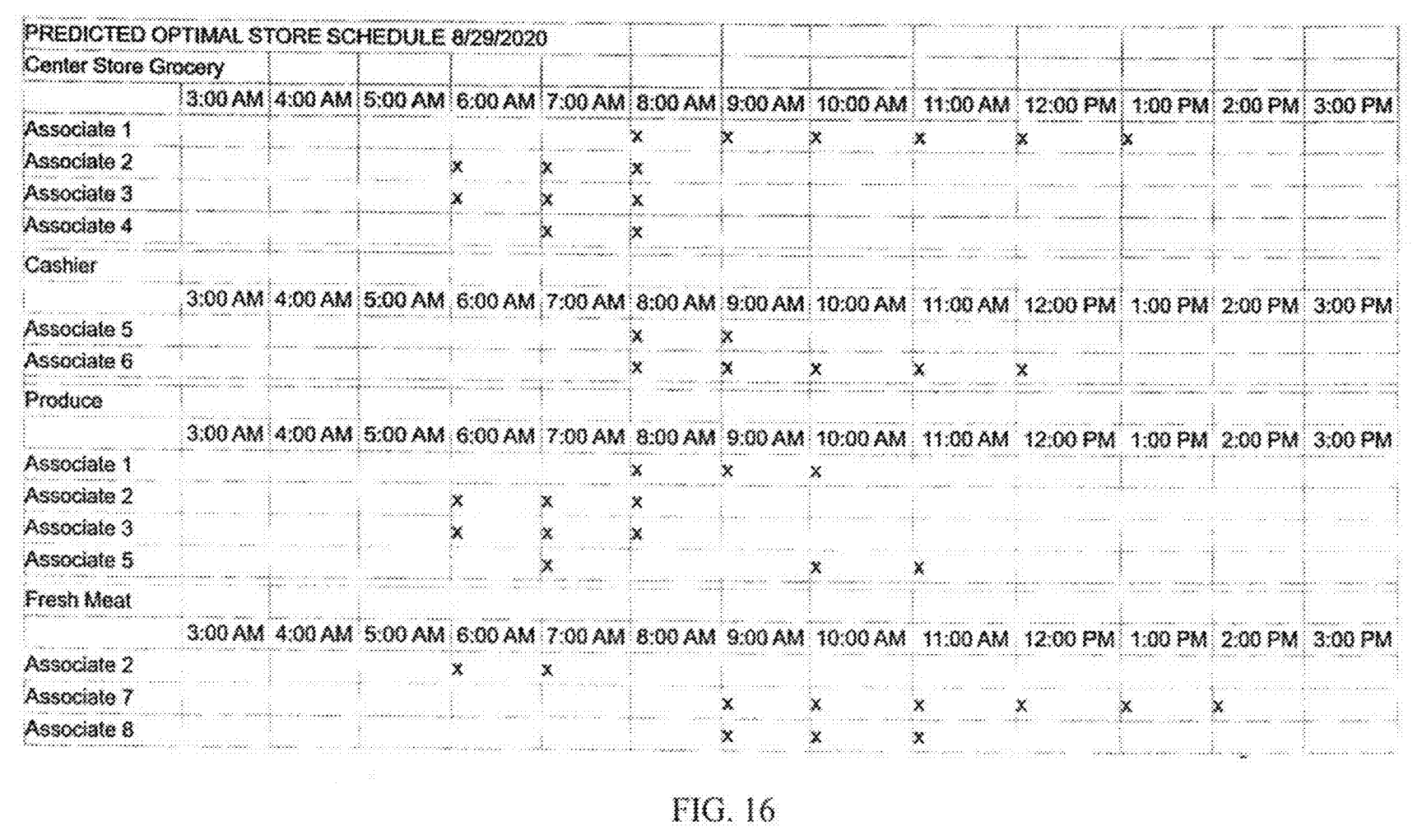

As an example regarding labor scheduling, if the System predicts a certain product will be out of stock (on the shelves) by 4 pm, it will advise management to have labor on hand for that task at 3 pm. FIG. 16 shows an example of System-predicted optimal store labor scheduling.

Figures 17, 18:
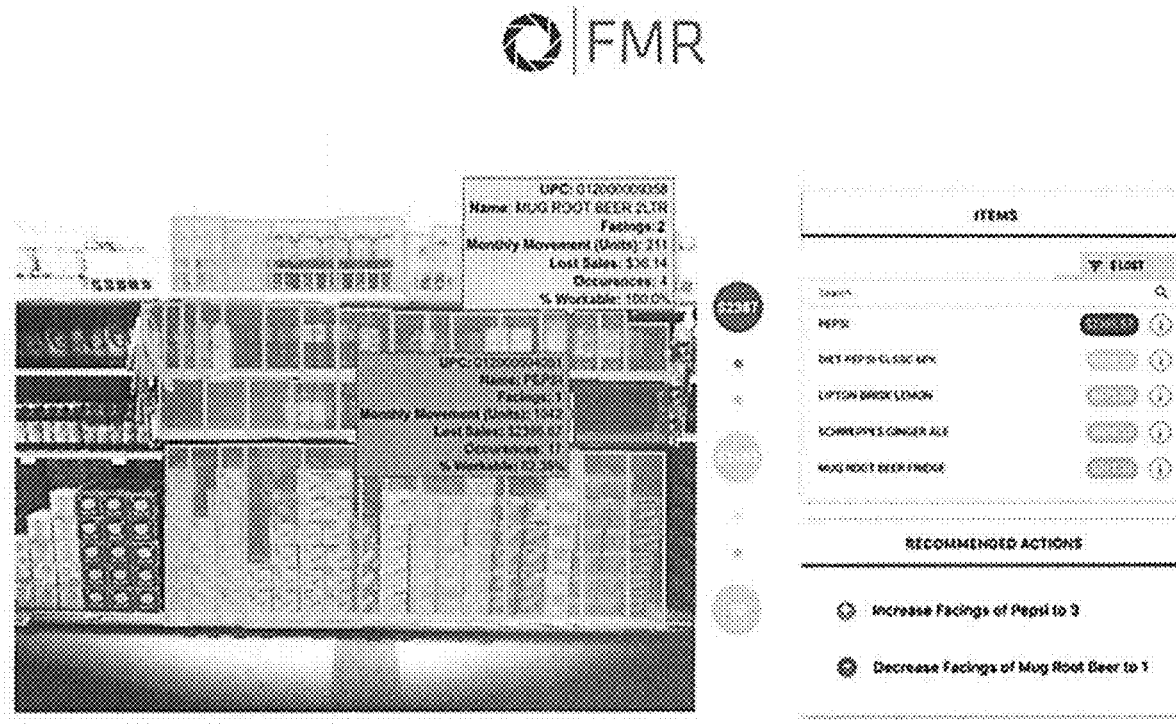
FIGS. 17 and 18 show reports for a store manager or employee, relating to chronic outs and suggesting possible solutions.

FIGS. 17 and 18 show further reports and visuals for store management. In FIG. 17 top chronic outs are listed, with numbers, percentages and estimated lost revenue. FIG. 18 shows a shelf image with a report regarding particular products, two different soft drinks, with monthly movement and estimated lost sales based on OOS occurrences. The System looks over many hours, many days and over many stores to find patterns of out of stock information, such as Coca-Cola Classic is out of stock 56.7% of the time (as in FIG. 17) and it has only one shelf facing, so the store can drastically improve on shelf availability conditions and sales if they increase the number of facings of this SKU and decrease the number of facings on another SKU that is always (or nearly always) in stock and has too many facings. This does not cost any labor, but increases revenue.

FIG. 19 shows an example of a daily report for management, which includes poor performance of one stocker, and non-completed priority tasks that are projected to increase revenue by a specified amount if completed. The system produces and constantly updates a set of tasks for each store employee (associate) to maximize reward. It also informs a manager of labor efficiency scores, compliance scores and how to improve. It also informs an associate of that associate's rank compared over time, and compared to other associates.

As shown in FIG. 20, associate leader boards show which stores and which associates are performing best.

Figure 21:
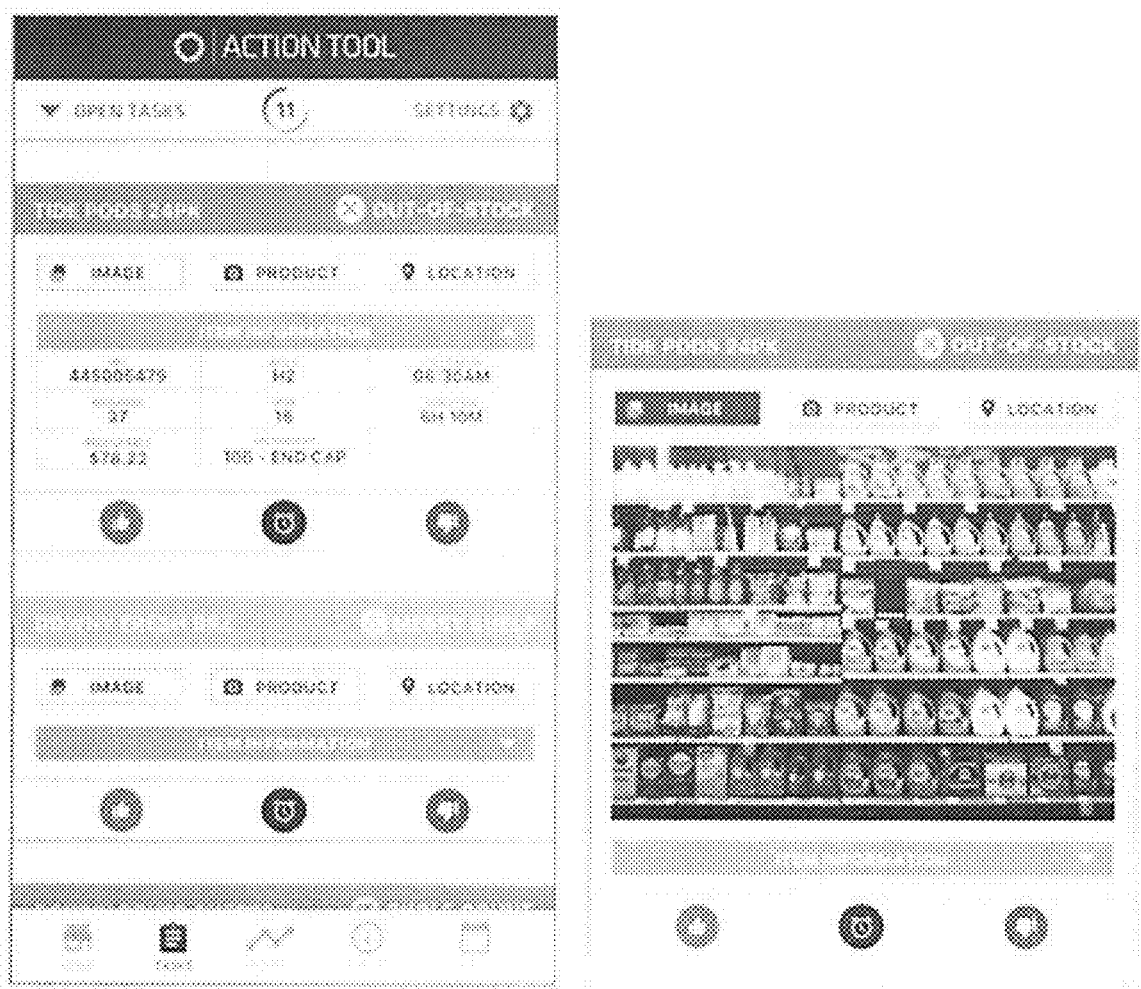
FIG. 21 shows potential screen shots presented by the system of the invention, recommending action to correct out of stock conditions.

FIG. 21 shows an example of a message to prompt management or employees to action. This information can be displayed on a tablet or computer, e.g. a smartphone. The screen on the left recommends action, while the screen on the right shows a shelf image with a bounding box indicating the out of stock item.

Figure 22:
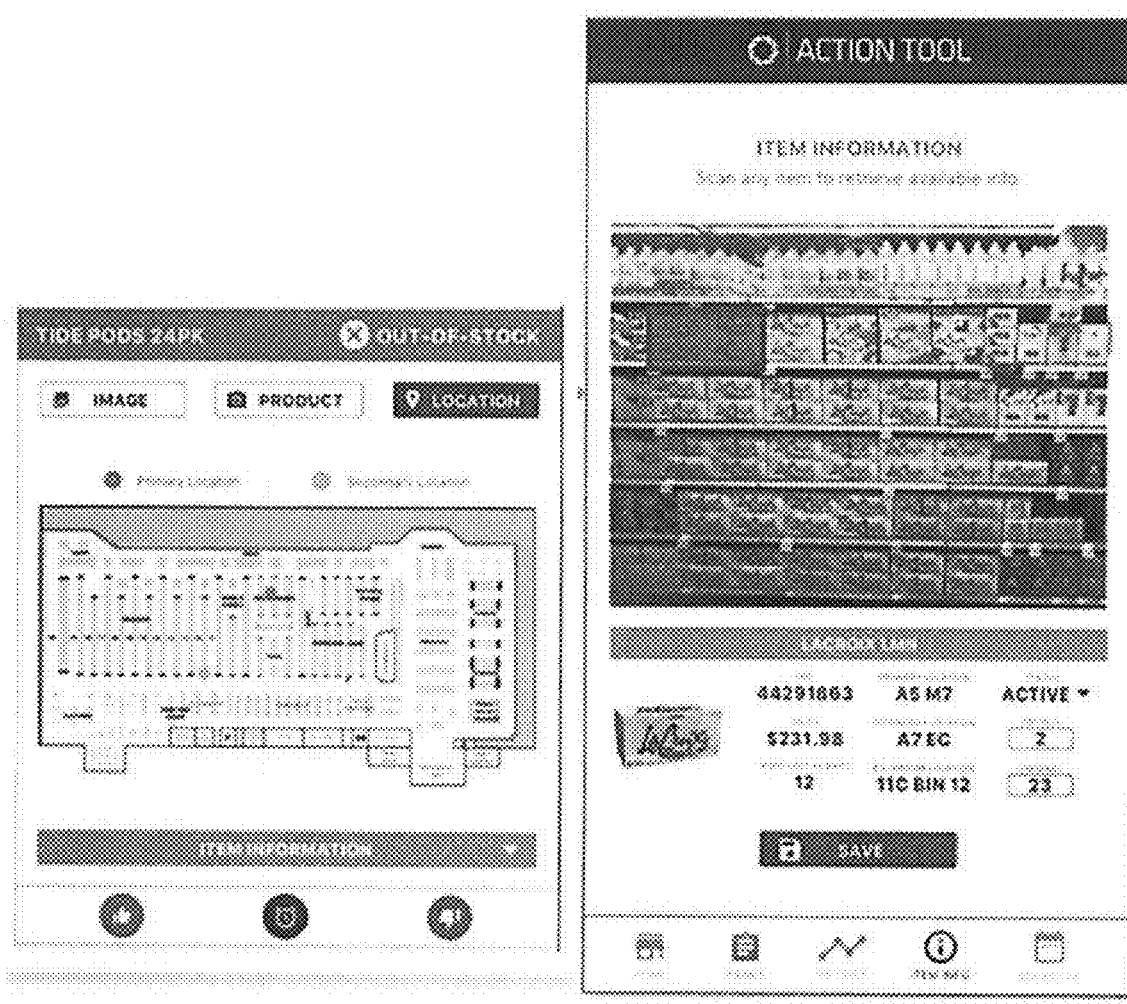
FIG. 22 shows further screen shots regarding tasks to be done.

FIG. 22 shows further example displays, indicating informing of a manager or associate of what to work, where they go to work it, and instructions on how to work it.

Figure 23:
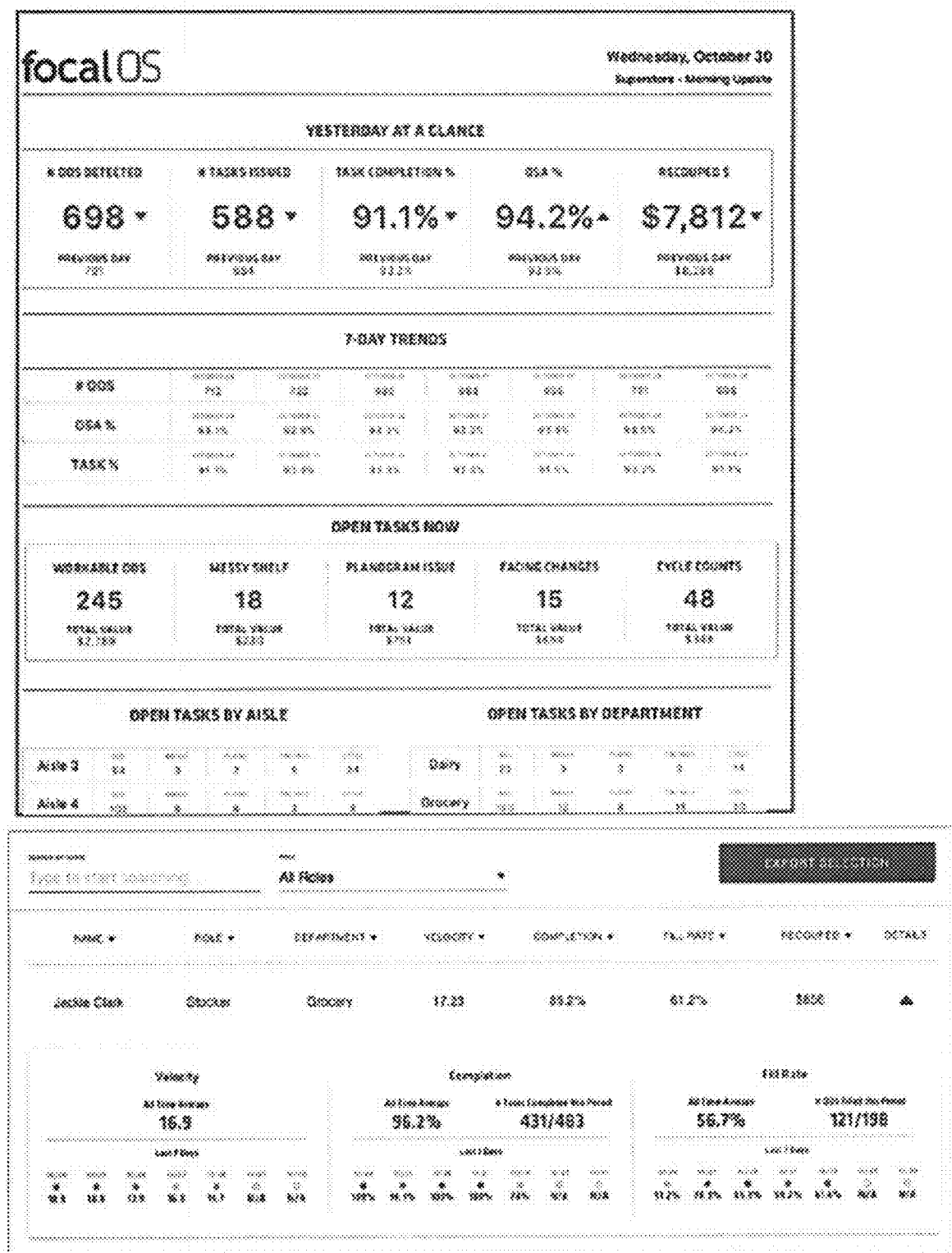
FIG. 23 shows an example of a report presented by the system regarding performance achieved the previous day.

FIG. 23 is another summary sheet for employees, showing OOS, tasks issued, tasks completed, on shelf availability (OSA) and projected revenue recouped by fulfilling of tasks. Seven day trends are also indicated, as are open tasks now. Open tasks can be indicated by aisle and by department.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A method conducted for a retail store, comprising:
   accessing a machine-learned model including a set of parameters, the machine-learned model coupled to receive state information for the retail store and generate a plurality of Q-values for a plurality of actions, wherein the plurality of actions describe decisions on shelf allocation for a plurality of products or on a per-product basis, and wherein a Q-value for a respective action indicates an estimated reward of taking a respective action toward achieving a goal or set of goals for the retail store; and
   sequentially performing, for each of a plurality of time intervals:
   obtaining a set of images from an optical sensor for a current time interval, the set of images capturing a region of the retail store where the plurality of products are shelved,
   determining current state information for the current time interval including at least an out of stock variable, the out of stock variable determined by processing the set of images for the current time interval and indicating whether at least one of the plurality of products are out of stock or at least not available in a designated place on a shelf,
   determining a measured reward for performing an action at a previous time interval using previous state information for the retail store, the reward describing feedback during the previous time interval with respect to the goal after performing the action,
   retraining the set of parameters of the machine-learned model using the previous state information, the reward for the current time period produced by the previously selected action, and the current state information,
   generating a set of Q-values for the current time interval by applying the retrained updated machine-learned model to the current state information,
   selecting an action to perform for the current time interval based on the generated set of Q-values and providing the selected action to a client device, and
   updating the current state information for the retail store as the previous state information for the next time interval.

2. The method of claim 1, wherein the plurality of actions further describe decisions on ordering amounts of inventory for a plurality of products or on a per-product basis for a plurality of time periods, and wherein a Q-value for a respective action indicates an estimated reward of taking a respective action toward achieving a goal or set of goals for the retail store.

3. The method of claim 1, wherein the plurality of actions further describe decisions on staffing levels and schedule for a plurality of roles for every hour over a plurality of days, and wherein a Q-value for a respective action indicates an estimated reward for staffing at a particular level at a particular time to achieve a goal or set of goals for the retail store.

4. The method of claim 1, wherein the plurality of actions further describe decisions on positioning of inventory for a plurality of products or on a per-product basis, and wherein a Q-value for a respective action indicates an estimated reward of taking a respective action toward achieving a goal or set of goals for the retail store.

5. The method of claim 1, wherein the plurality of actions further describe decisions on the allocation and priority of tasks to individual associates for a plurality of roles, and wherein a Q-value for a respective action indicates an estimated reward of taking a respective action toward achieving a goal or set of goals for the retail store.

6. The method of claim 1, wherein the plurality of actions further describe decisions on the price for a plurality of products or on a per-product basis for a plurality of time periods, and wherein a Q-value for a respective action indicates an estimated reward of taking a respective action toward achieving a goal or set of goals for the retail store.

7. A method for optimizing shelf allocation and controlling stock and stocking of shelves of items in a retail store, comprising:
   (a) with cameras fixed in place on fixed structure of the store and directed at shelves of items, producing camera images of items and analyzing the images with a programmed store computer, recognizing the items and monitoring presence and depletion of the items on the shelves, including recording time of at least an out of stock occurrence of an item, (b) from data produced in step (a), over a period of time, identifying chronic-out conditions of an item, (c) from data produced in step (a), over a period of time, identifying persistent-out conditions of items, (d) automatically reporting to a store operator with recommendations for corrective action on any chronic-out or persistent-out conditions by increasing stock of an item on shelves or by increasing ordered volume of a persistent-out item to increase inventory, so that store personnel can take the recommended corrective action, and (e) after a period of days or weeks following corrective action as in step (d), automatically measuring any change in sales volume of an item for which corrective action has been taken, and reporting to the operator.

8. The method of claim 7, wherein the cameras are fixed in position across an aisle from the shelves of items.

9. The method of claim 7, further including, after said period of days or weeks, automatically determining any difference in sales of other items of similar category to the item for which corrective action was taken.

10. The method of claim 7, further including repeating step (e) after a further period of days or weeks to automatically determine any specific patterns of chronic or persistent-out conditions for which corrective action has been taken, to reduce out conditions, or over-corrected such that excessive stock remains on shelves.

11. The method of claim 7, wherein the recommendations for corrective action include recommended quantities to be changed.

12. The method of claim 7, further including, following step (d), automatically monitoring shelves daily to automatically determine whether the chronic-out or persistent-out condition has been corrected, and if not, recommending further corrective action.

13. The method of claim 7, wherein monitoring of presence and depletion of items further includes automatically detecting a low-stock condition of an item on a shelf and automatically predicting when the item will be out of stock, and reporting the condition to the store operator.

14. The method of claim 7, further including applying reinforcement learning to predict when and to what extent restocking of items should be undertaken, based on data from a prior period, and producing more accurate predictions as more data are processed over time and predictions are compared with actual occurrences.

15. The method of claim 14, wherein labor needs are also predicted with said reinforcement learning, for restocking or tasks to remedy predicted or actual out of stock occurrences.

* * * * *